United States Patent [19]

Gupta et al.

[11] Patent Number: 5,390,278
[45] Date of Patent: Feb. 14, 1995

[54] PHONEME BASED SPEECH RECOGNITION

[75] Inventors: Vishwa N. Gupta, Brossard; Matthew Lennig; Patrick J. Kenny, both of Montreal; Christopher K. Toulson, Dollard des Ormeaux, all of Canada

[73] Assignee: Bell Canada, Montreal, Canada

[21] Appl. No.: 772,903

[22] Filed: Oct. 8, 1991

[51] Int. Cl.⁶ .............................................. G10L 5/04
[52] U.S. Cl. .............................. 395/2.52; 395/2.63; 395/2.64; 395/2.65; 395/2.5; 395/2.49
[58] Field of Search .............. 381/43, 41, 42; 379/88; 395/2, 2.49, 2.5, 2.52, 2.63-2.65

[56] References Cited

U.S. PATENT DOCUMENTS

| | | | |
|---|---|---|---|
| Re. 33,597 | 5/1991 | Levinson et al. | 381/43 |
| 4,587,670 | 5/1986 | Levinson et al. | 381/43 |
| 4,783,804 | 11/1988 | Juang et al. | 381/43 |
| 4,803,729 | 2/1989 | Baker | 381/43 |
| 4,805,219 | 2/1989 | Baker et al. | 381/43 |
| 4,903,305 | 2/1990 | Gillick et al. | 381/43 |
| 4,956,865 | 9/1990 | Lennig et al. | 381/43 |
| 5,072,452 | 12/1991 | Brown et al. | 381/43 |
| 5,193,142 | 3/1993 | Zhao | 395/2 |
| 5,195,167 | 3/1993 | Bahl et al. | 395/2 |

OTHER PUBLICATIONS

Matthew Lennig, "Putting Speech Recognition to Work in the Telephone Network," Computer vol. 23, No. 8, IEEE Computer Society, Aug. 1990.

"An Introduction to the Application of the Theory of Probabilistic Functions of a Markov Process to Automatic Speech Recognition", by S. E. Levinson et al., The Bell System Technical Journal, vol. 62, No. 4, Apr. 1983, pp. 1035-1074.

"Continuous Speech Recognition by Statistical Methods"0 by Frederick Jelinek, Proceedings of the IEEE, vol. 64, No. 4, Apr. 1976, pp. 532-556.

"Acoustic Recognition Component of an 86,000-word Speech Recognizer" by L. Deng et al., Proceedings of the IEEE Conference on Acoustics, Speech and Signal Processing, 1990, pp. 741-744.

"Application of an LPC Distance Measure to the Voiced-Unvoiced-Silence Detection Problem", by Lawrence R. Rabiner et al., IEEE Transactions on Acoustics, Speech, and Signal Processing, vol. AS-SP-25, No. 4, Aug. 1977, pp. 338-343.

"Average Magnitude Difference Function Pitch Extractor", by Myron J. Ross et al., IEEE Transactions on Acoustics, Speech, and Signal Processing, vol. AS-SP-22, Oct. 1974, pp. 353-362.

"Line Spectrum Pair (LSP) and Speech Data Compression", by Frank Soong et al., Proceedings of the IEEE 1984 International Conference on Acoustics, Speech and Signal Processing, pp. 1.10.1-1.10.4.

"A*—admissible heuristics for rapid lexical access" by P. Kenny et al., Proceedings of 1991 International Conference on Acoustics, Speech and Signal Processing, pp. 689-692.

Primary Examiner—David D. Knepper
Attorney, Agent, or Firm—Dallas F. Smith

[57] ABSTRACT

A flexible vocabulary speech recognition system is provided for recognizing speech transmitted via the public switched telephone network. The flexible vocabulary recognition (FVR) system is a phoneme based system. The phonemes are modelled as hidden Markov models. The vocabulary is represented as concatenated phoneme models. The phoneme models are trained using Viterbi training enhanced by: substituting the covariance matrix of given phonemes by others, applying energy level thresholds and voiced, unvoiced, silence labelling constraints during Viterbi training. Specific vocabulary members, such as digits, are represented by allophone models. A* searching of the lexical network is facilitated by providing a reduced network which provides estimate scores used to evaluate the recognition path through the lexical network. Joint recognition and rejection of out-of-vocabulary words are provided by using both cepstrum and LSP parameter vectors.

28 Claims, 13 Drawing Sheets

PHONEME BASED SPEECH RECOGNITION

This invention relates to a method of speech recognition and is particularly concerned with such speech recognition for user-independent and flexible vocabulary applications.

Statistical methods of speech recognition are often based on the assumption that the sequence of acoustic observations corresponding to an unknown utterance to be recognized is accounted for by a path through a hidden Markov Model (HMM) which serves as a speech production model. The recognition problem is usually formulated as one of finding the sequence of states in the hidden Markov chain whose posterior probability (given the acoustic observations) is maximal. There is a large computational burden associated with such a scheme, which in systems of medium or larger vocabulary (100 words or greater), and particularly systems intended for speaker-independent use, may inhibit the ability of such systems to respond in real time intervals.

The use of HMM is well known in the art as described in the article by S. E. Levinson, L. R Rabiner and M. M. Sondhi (1983) entitled: "An introduction to the application of the theory of probabilistic functions of a Markov process to automatic speech recognition" B.S.T.J., 62(4), 1035–1074.

Other problems arise when applying speech recognition techniques in systems for recognition of words spoken over a public switched telephone network.

An object of the present invention is to provide an improved method of speech recognition for medium vocabulary.

In accordance with an aspect of the present invention there is provided a method of preparing phoneme models for recognition of speech received via telephone lines comprising the steps of: a) analyzing a training word to generate a frame sequence of acoustic parameter vectors representative thereof; b) providing a first set of model parameters representative of a sequence of state-transition models corresponding to the training word, the parameters including a mean vector and weighting factor for each transition and a covariance matrix for each model; c) computing a set of observation probabilities for the training word and the first set of model parameters; d) aligning the frame sequence of acoustic parameter vectors with the sequence of state-transition models to provide a mapping therebetween representative of a path through the sequence of state-transition models having a highest likelihood; e) accumulating statistics for a plurality of utterances of said training word using the mapping of step d); f) generating a second set of model parameters representative of the sequence of state-transition models corresponding to the training word; g) repeating step d) for the second set of model parameters; h) comparing the likelihood of the first and second sets of model parameters; and i) repeating step b) through h), replacing the first set of model parameters by the second set of model parameters when the second set of parameters provides at least a predetermined improvement in likelihood; and j) substituting the covariance matrix of a first model with the covariance matrix of a second model to provide a smooth covariance matrix thereby improving recognition accuracy for the first model.

In accordance with another aspect of the present invention there is provided a method of preparing phoneme models for recognition of speech received via telephone lines comprising the steps of: a) analyzing a training word to generate a frame sequence of acoustic parameter vectors representative thereof, having a parameter indicative of energy level for each frame of the frame sequence; b) providing a first set of model parameters representative of a sequence of state-transition models corresponding to the training word; c) computing a set of observation probabilities by, for each frame of the frame sequence and each model of the sequence of state-transition models, comparing the energy level of the frame with a predetermined, relative to noise on the telephone lines, energy threshold for the model, and if the energy level is below the energy threshold, setting the observation probability for the frame to zero, otherwise computing the observation probability for the frame; d) aligning the frame sequence of acoustic parameter vectors with the sequence of state-transition models to provide a mapping therebetween representative of a path through the sequence of state-transition models having a highest likelihood; e) accumulating statistics for a plurality of utterances of said training word using the mapping of step d); f) generating a second set of model parameters representative of the sequence of state-transition models corresponding to the training word; g) repeating step d) for the second set of model parameters; h) comparing the likelihood of the first and second sets of model parameters; and i) repeating step b) through h), replacing the first set of model parameters by the second set of model parameters when the second set of parameters provides at least a predetermined improvement in likelihood.

In accordance with a further aspect of the present invention there is provided a method of preparing phoneme models for recognition of speech received via telephone lines comprising the steps of: a) analyzing a training word to generate a frame sequence of acoustic parameter vectors representative thereof and to label each frame of the frame sequence as voiced, unvoiced or silence; b) providing a first set of model parameters representative of a sequence of state-transition models corresponding to the training word, including the step of labelling each model as voiced, unvoiced or silence in dependence upon a phoneme represented by the model and a relative position of the model in the sequence; c) computing a set of observation probabilities by, for each frame of the frame sequence and each model of the model sequence of state-transition models, comparing a voiced-unvoiced-silence (VUS) label of the frame with a VUS label of the model and if the labels do not match, setting the observation probability for the frame to zero, otherwise computing the observation probability for the frame for the training word and the first set of model parameters; d) aligning the frame sequence of acoustic parameter vectors with the sequence of state-transition models to provide a mapping therebetween representative of a path through the sequence of state-transition models having a highest likelihood; e) accumulating statistics for a plurality of utterances of said training word using the mapping of step d); f) generating a second set of model parameters representative of the sequence of state-transition models corresponding to the training word; g) repeating step d) for the second set of model parameters; h) comparing the likelihood of the first and second sets of model parameters; and i) repeating step b) through h), replacing the first set of model parameters by the second set of model parameters when the second set of parameters provides at least a predetermined improvement in likelihood.

In accordance with a further aspect of the present invention there is provided a method of speech recognition for speech received via telephone lines comprising the steps of: a) analyzing an unknown utterance to generate a frame sequence of acoustic parameter vectors representative thereof; b) providing a first network representing a recognition vocabulary, wherein each branch of the first network is a model representing a phoneme and each complete path through the first network is a sequence of models representing a word in the recognition vocabulary; c) providing a second network derived from the first network, in which all sequences of three consecutive phonemes present in the first network are present; d) computing transitional probabilities for each node of the second network given the frame sequence of acoustic parameter vectors; e) searching the second network to determine optimal cumulative probabilities for each node of the second network for all frames of the frame sequence; f) storing the cumulative probabilities as estimate scores for estimating partial paths in the first network; g) computing point scores for all phonemes in dependence upon the frame sequence of acoustic parameter vectors; and h) determining a complete path through the first network by evaluating successive one phoneme extensions of partial paths using the estimate scores for the nodes of the second network to find the partial path to extend.

In accordance with a further aspect of the present invention there is provided apparatus for speech recognition, comprising: a) means for analyzing an unknown utterance to generate a frame sequence of acoustic parameter vectors representative thereof; b) means for providing a first network representing a recognition vocabulary, wherein each branch of the first network is a model representing a phoneme and each complete path through the first network is a sequence of models representing a word in the recognition vocabulary; c) means for providing a second network derived from the first network, in which all sequences of three consecutive phonemes present in the first network are present; d) means for computing transitional probabilities for each node of the second network given the frame sequence of acoustic parameter vectors; e) means for searching the second network to determine optimal cumulative probabilities for each node of the second network for all frames of the frame sequence; f) means for storing the cumulative probabilities as estimate scores for estimating partial paths in the first network; g) means for computing point scores for all phonemes in dependence upon the frame sequence of acoustic parameter vectors; and h) means for determining a complete path through the first network by evaluating successive one phoneme extensions of partial paths using the estimate scores for the nodes of the second network to find the partial path to extend.

In accordance with a further aspect of the present invention there is provided apparatus for providing information via a telephone network, comprising: means for accepting a call from an operator via the telephone network; means for prompting the operator to request information; means for recognizing speech from the operator to identify a member of a recognition vocabulary; means for accessing a computerized information source to request information from the computerized information source in dependence upon the member of the recognition vocabulary identified; and means for synthesizing speech to provide the accessed information to the operator in verbal form.

A flexible vocabulary speech recognition system can be defined as having the ability to configure the recognizer to recognize new vocabulary members without having to retrain for the new members.

The present flexible vocabulary recognition (FVR) system is intended to recognize words spoken over the public switched telephone network. The system is designed to be flexible in vocabulary size and to recognize words spoken by any speaker. In order to provide flexible vocabulary, the system recognizes words as a sequence of phonemes. There are approximately 40 phonemes which can generate any word in American English.

BRIEF DESCRIPTION OF THE DRAWINGS

The present invention will be further understood from the following description with reference to the drawings in which.

A flexible vocabulary recognition system presents several challenges. To provide flexibility in the vocabulary, that is, the ability to delete, add, and substitute vocabulary words, without incurring the burden of retraining for those words, vocabulary members are described in terms of their elemental phonemes.

In accordance with the present invention, the recognition system is based on hidden Markov modelling (HMM). The recognition system will be described in two parts, the first is training of hidden Markov models for phonemes (phoneme models), and the second is recognition of the unknown utterance.

Figure 1:
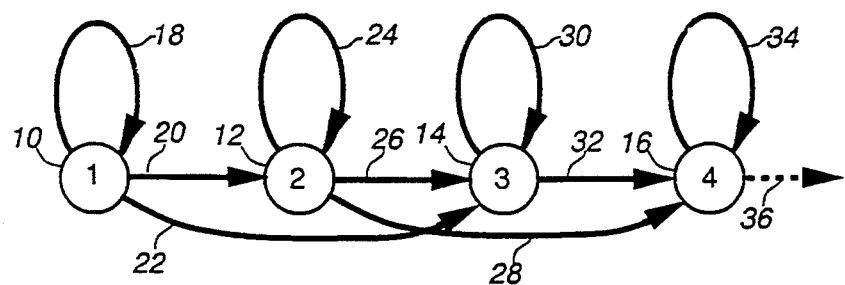
FIG. 1 illustrates a Markov model.

A Markov Model is a set of states with transitions describing possible paths within the states that model some phenomena. Every time a transition occurs, some characteristic vector is emitted. Referring to FIG. 1, there is illustrated a Markov model having four states, 10, 12, 14 and 16. Transitions within the model are shown as directed lines. The state 10 has three possible transitions, a self transition 18, a next state transition 20, and a skip state transition 22. The state 12 also has self, next and skip transitions, 24, 26, 28 respectively. The state 14 has self and next transitions, 30 and 32, while the state 16, representing the end of the phoneme has only a self-transition 34 and a null transition 36. The null transition 36 merely provides a link to a next phoneme model. In the present invention, the assumption is that each phoneme in a given utterance is generated by a Markov Model. Every time a transition is made in the Markov Model, a cepstrum vector, representing the utterance, is emitted.

In the case of Hidden Markov Models, it is further assumed that there is no access to the original Markov process which generated the emitted vectors, there is only the observation of the vectors themselves.

In the present invention, the FVR system is based on first order Markov Models. That is, the probability of entering a given state is dependent only on the immediately previous state (i.e. not earlier states). Given this, there is a transition probability (mean vector and covariance matrix) associated with each transition. The probability of proceeding on a particular transition can be calculated given an observation vector. The idea, then, is to maximize the cumulative probability through the state machine given the observed vectors.

The training method estimates the parameters of phoneme models from a large number of utterances. Models for these phonemes are trained in a vocabulary-independent and speaker-independent manner, so that new words can be added to the vocabulary without any need for retraining. Speaker-independence is achieved by training the phoneme models from a large number of speakers, while the vocabulary-independence is achieved by training the phoneme models from a large number of words not in the recognition vocabulary. A system having a flexible vocabulary is desirable in many applications where the vocabulary changes with time, for example, in applications where queries about companies listed in a stock exchange have to be answered.

For the present invention, as described above, phonemes are modelled by first order hidden Markov processes. Conceptually, traversing the states in the model may be likened to progressing through the various portions of a phoneme (onset, body, termination).

The phoneme models are left-to-right (or Bakis) HMMs as described in the article by F. Jelinek, (1976) "Continuous speech recognition by statistical methods", Proceedings of the IEEE, 64(4), pp. 532-556, and the number of states in the phoneme models vary from 3 to 10 depending on the phoneme. The phoneme models are transition based, with each transition output probability represented by a Gaussian mixture distribution as described in Deng et al. (1990) "The Acoustic Recognition Component of the INRS-Telecom 86,000-word Speech Recognizer", Proceedings of the IEEE International Conference on Acoustics, Speech and Signal Processing, pp. 741-744. This Gaussian mixture is represented by 12 means and a covariance matrix. One pooled covariance matrix is estimated for all the transitions in the phoneme model.

Figure 2:
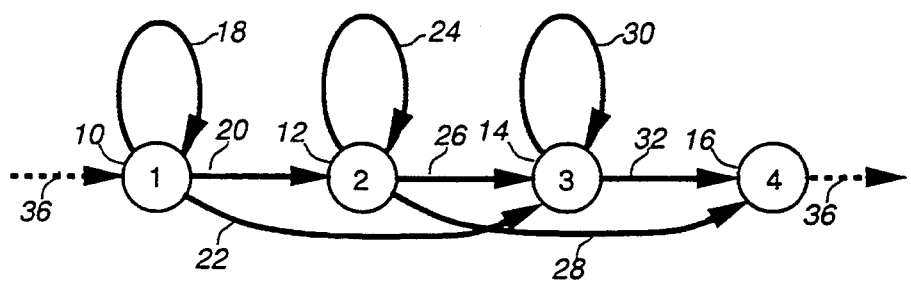
FIG. 2 illustrates a Markov model of a phoneme.

Referring to FIG. 2, there is illustrated a Markov model of a phoneme.

Transitions within the phoneme models, then, are constrained as follows:
1) the initial state 10 has only a self loop 18 as an entry path, and a null transition 38 from the last state of the previous phoneme.
2) the second state 12 has only the previous state transition 30 or a self loop 24 as entry paths,
3) the last state 16 has no self loop as an entry path, and has a null transition 36 to the next phoneme.
4) all other states 14 have a self loop 30, a previous state 26, and a skip last state 22 transition as entry paths.

With these constraints, the last state 16 in each phoneme may be considered a "collector" and its cumulative probability may be propagated to the first state of all connected phonemes via the null transition 36.

In order to reduce the size of the data the covariance matrix is pooled across the complete phoneme. Also, the covariance matrix is pooled because there is insufficient data available to generate covariance matrices for each transition. Thus, all modes for all transitions in a given phoneme share a common covariance matrix.

The specific data, then, associated with a model is as follows:
- a 15×15 matrix of floating point numbers that is a covariance matrix.
- a set of states, S, and associated transitions, T, which define the allowable next states. A model has, on average, 5 states with 11 transitions.

Each transition element has a number of mixtures or modes, M, associated with it. The mode consists of a floating point number W, that represents the weight and an array of 15 floating point numbers, that represents the mean.

The modes or mixtures can be considered to describe a general class of speech type (e.g. male, female, high pitched, etc). In the present embodiment of the FVR system, 12 mixtures are used. Each mixture can have its own mean, covariance and weight. The weight can be considered as the general probability of using that mode for the given transition. The transition probability is computed from the following formula.

$$\max_{12} \left\{ \left( \frac{1}{(2\pi)^{d/2} |\Sigma|^{-\frac{1}{2}}} e^{-\frac{1}{2}(x-\mu_i)^t \Sigma^{-1}(x-\mu_i)} \right) \cdot w_i \right\}$$

where:
$x$ is the observation vector
$\mu_i$ is the mean vector for mode $i$ ⎫
$w_i$ is the weight for mode $i$ ⎬ Phoneme Model parameters
$\Sigma$ is the convariance matrix ⎭
$t$ indicates transpose -continued

*d* is the vector dimention

To estimate parameters for these phoneme models, Viterbi training is used. In Viterbi training, the sequence of most likely state transitions through the string of phoneme models corresponding to the words in the training set is found. The mapping thus obtained between the state transitions and the feature parameter vectors is used to estimate the parameters of the phoneme models.

Figure 3:
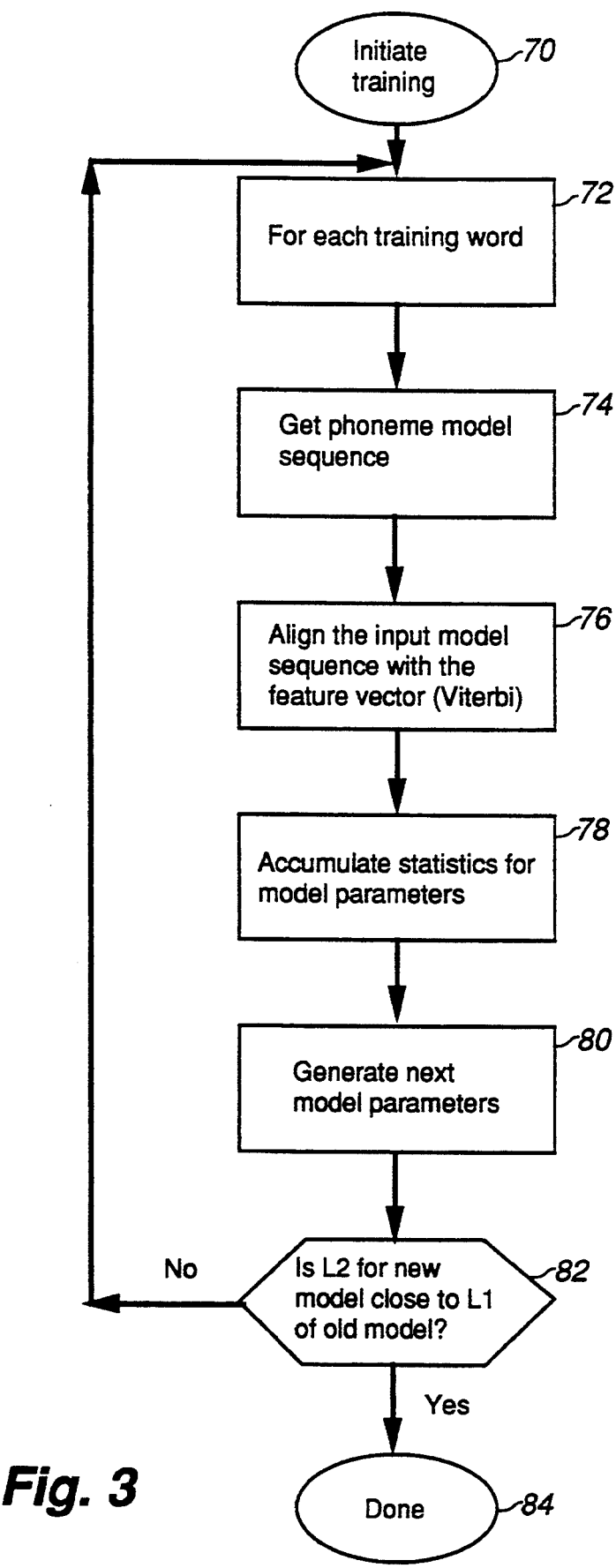
FIG. 3 illustrates in a flow chart the general steps of a method known in the art as Viterbi training.

Referring to FIG. 3, there is illustrated in a flow chart, the general steps of a method known in the art as Viterbi training. Training is initiated at 70 once samples of spoken words have been collected for a set of training words. Each training word, 72, is represented by a phoneme sequence 74. The phoneme sequence is then aligned with the observed feature vectors for that word using the well known Viterbi method, 76. Once the phoneme model transitions have been mapped to the observed feature vectors (one transition to one vector), statistics are accumulated using such mapping from the word spoken by various speakers, 78. The statistics are used to modify the phoneme model parameters 80. The old model is compared to the new one by computing the likelihood for each model given the observed feature vectors, 82. If the difference is below a predetermined amount, the training is complete, 84. Otherwise, the process is repeated beginning with block 72.

The step represented by box 76 will be described in greater detail in connection with FIGS. 6 and 7, that illustrate modifications of the standard Viterbi training method in accordance with the present invention.

Figure 4:
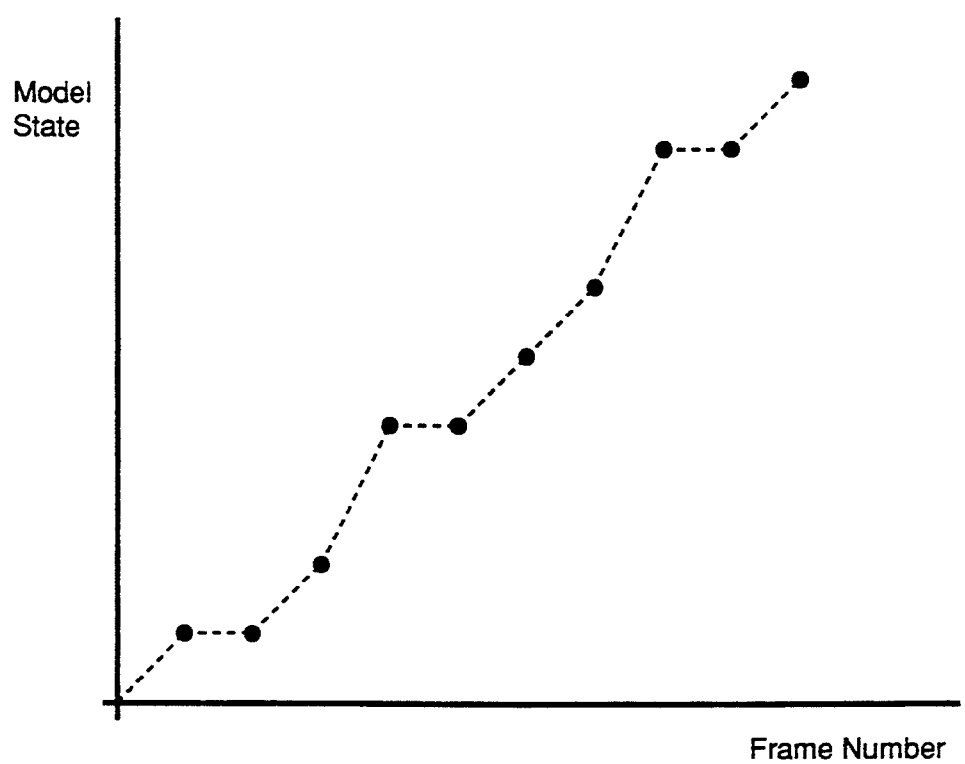
FIG. 4 graphically illustrates the most likely path of state transitions through the phoneme model sequence found by the well known Viterbi method.

Referring to FIG. 4, there is graphically illustrated the most likely path of state transitions through the phoneme model sequence found by the well known Viterbi method. In the Viterbi method the states of the phoneme model sequence for an input word are labelled sequentially and plotted along one axis (in FIG. 4, the y-axis). The frame numbers for the corresponding observed feature vector sequence are plotted sequentially along another axis (in FIG. 4, the x-axis). For each transition between states, for each frame, the probability is calculated and stored in a trellis. Once all such probabilities are computed, a path is traced from beginning to end of the sequence. The path represents the highest likelihood path. The path provides a mapping between the transitions of the phoneme model sequence and the observed feature vector sequence.

In the present invention, the training method has been modified to obtain phoneme models that improve recognition accuracy significantly. The modifications include substitution of covariance matrix following training, use of energy thresholds during training phoneme models, and imposition of voiced-unvoiced-silence constraints during training of the phoneme models.

Figure 5:
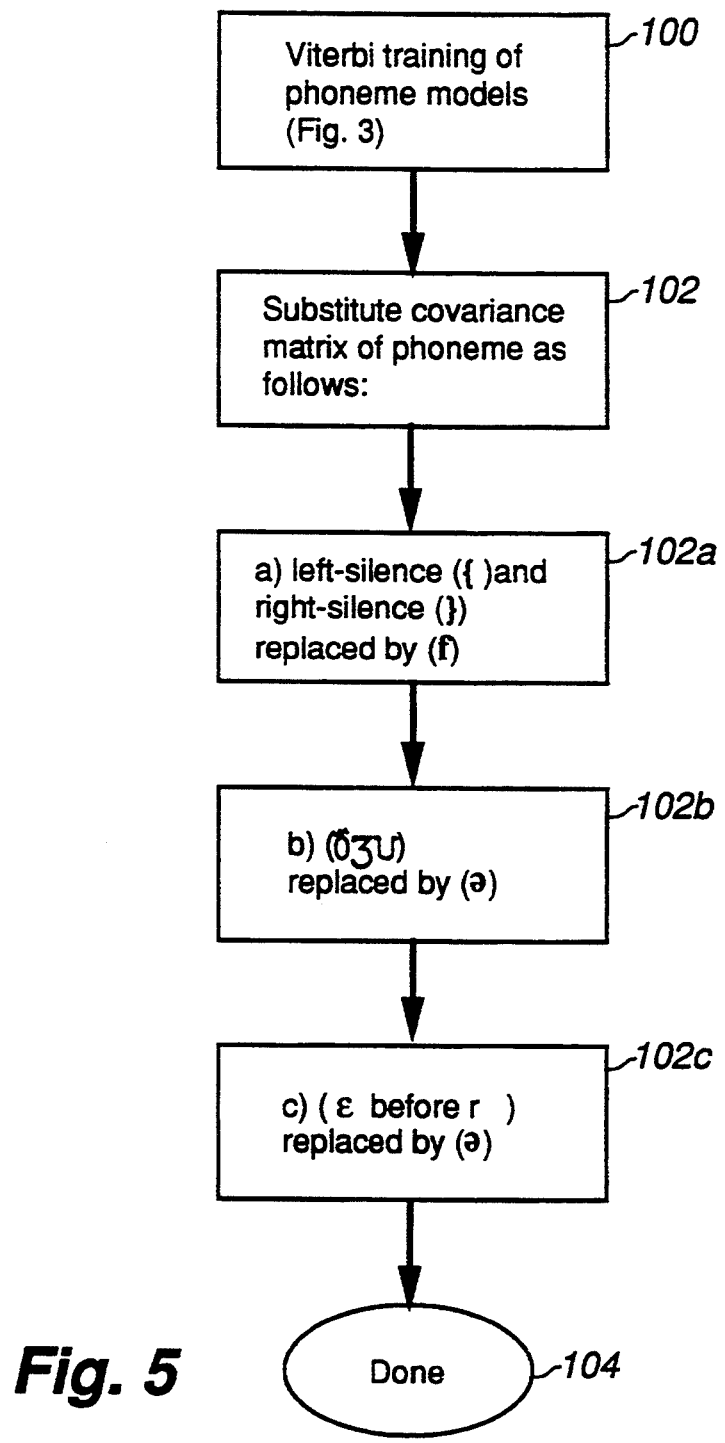
FIG. 5 illustrates in a flow chart the method of covariance matrix substitution in accordance with an embodiment of the present invention.

Referring to FIG. 5, there is illustrated in a flow chart the method of covariance matrix substitution in accordance with an embodiment of the present invention. A box 100 represents the well known Viterbi training method as described hereinabove in connection with FIG. 3. A box 102 represents the substitution of covariance matrices. In step 102*a*) the covariance matrix for left-silence or utterance-initial silence, represented by the symbol { and the right-silence or utterance-final silence, represented by the symbol } is replaced by the covariance matrix for the phoneme f. In step 102*b*) the covariance matrix for the phonemes /ð ʒ uː/ is replaced by the covariance matrix for the phoneme . In step 102*c*) the covariance matrix for the phoneme ε before r is replaced by the covariance matrix for the phoneme ə . The reasons for these covariance matrix substitutions is described below.

The phoneme models trained include models for utterance-initial and utterance-final silences. (Table 1 shows a complete list of the phoneme models.) Even though the utterance-initial and utterance-final silence models are trained from a large amount of training data, the covariance matrices for the silence models are sharper than other phoneme models. These covariance matrices can cause recognition errors if the utterance-initial or utterance-final silence segments contain impulse noise, cough, breath noise, aspiration, or silence segments due to a noisy telephone line. The recognition errors arise from the silence segments, which include noise, more closely matching the phoneme models than to the utterance-initial or utterance-final silence models. The recognition errors for the silence models can be mitigated by reducing the sharpness of the covariance matrices for utterance-initial and utterance-final silences. The preferred method is to substitute the covariance matrix for the phoneme /f/ model for the covariance matrices for the utterance-initial and utterance-final silences. The spectral characteristics for phoneme /f/ look similar to those of telephone noise for a noisy telephone channel, for breath noise, and for aspiration. Such a substitution of covariance matrices results in dramatic improvement in recognition accuracy. (Substitution of the utterance-initial and utterance-final covariance matrices by matrices of other fricative phonemes also works, but not as well as that by phoneme /f/.)

TABLE 1

List of all the phoneme models used in flexible vocabulary recognition. The phonemes are explained through an example word in which they occur.

| phoneme | example word | phoneme | example word |
|---|---|---|---|
| /aj/ | I | /aw/ | out |
| /ɔj/ | boy | /ɑ/ | far |
| /i/ | eat | /I/ | bit |
| /e/ | bait | /ε/ | bet |
| /æ/ | bat | /ε/ before /r/ | air |
| /ʌ/ | but | /U/ | put |
| /u/ | boot | /o/ | coal |
| /ə/ | a (unstressed) | /j/ | you |
| /w/ | was | /l/ | live |
| /r/ | are | inter-word silence | |
| utterance-initial silence | | utterance-final silence | |
| /p/ | pit | /b/ | bit |
| /t/ | to | /d/ | dog |
| /k/ | could | /g/ | go |

TABLE 1-continued

List of all the phoneme models used in flexible vocabulary recognition. The phonemes are explained through an example word in which they occur.

| phoneme | example word | phoneme | example word |
|---|---|---|---|
| /tʃ/ | church | /dʒ/ | judge |
| /f/ | fill | /v/ | have |
| /θ/ | thing | /ð/ | the |
| /s/ | say | /z/ | zoo |
| /ʃ/ | shoe | /ʒ/ | garage |
| /m/ | me | /n/ | no |
| /ŋ/ | going | /h/ | he |

The phonemes /ð ʒ u/ do not occur frequently in the training data, as a consequence the covariance matrices for these phoneme models are sharper than the covariances for other phonemes that occur more frequently. Hence, many recognition errors occur for utterances containing phonemes /ð ʒ u/. To reduce the sharpness of the covariances for these phonemes, the covariance matrix for the phoneme /ə/ is substituted for the covariance matrices for these phonemes. The covariance matrix for /ə/ has the least sharpness and provides the best improvement in recognition accuracy.

The phoneme /ɛ/ before /r/ has its own phoneme model. Even though this phoneme occurs quite frequently, its covariance matrix is quite sharp. The reason is that the spectral characteristics within the phoneme are quite uniform, but the spectral characteristics across different samples of the phoneme vary considerably. Reducing the sharpness of the covariance matrix for /ɛ/ before /r/, reduces recognition errors for words which contain /ɛ/ before /r/. This is accomplished by substituting the covariance matrix for /ɛ/ by covariance matrix for /ə/.

The smoothing of covariance matrices, as described above, is done after the Viterbi training method.

As described hereinabove, the Viterbi training method is used to estimate the parameters of the phoneme models. During the Viterbi training method, boundary markers for each phoneme in the spoken utterance are established. These boundaries correspond to the sequence of phonemes making up the utterance. Many of these boundaries turn out to be incorrect. For example, speech segments identified as vowels may actually contain silent segments or parts of fricative segments. The effect of errors in phoneme boundaries is to train phoneme models from speech segments not corresponding to those phonemes. Some of these errors may be eliminated by using energy thresholds. For example, to avoid vowel phonemes from mapping to noise or weak fricatives, an energy threshold is used. Only those segments of speech with energy greater than the energy threshold can map to the vowels. Since, in the public switched telephone network, the background noise level can vary from one dialled-up line to another, the energy thresholds are set relative to the noise level on the telephone line.

Figure 6:
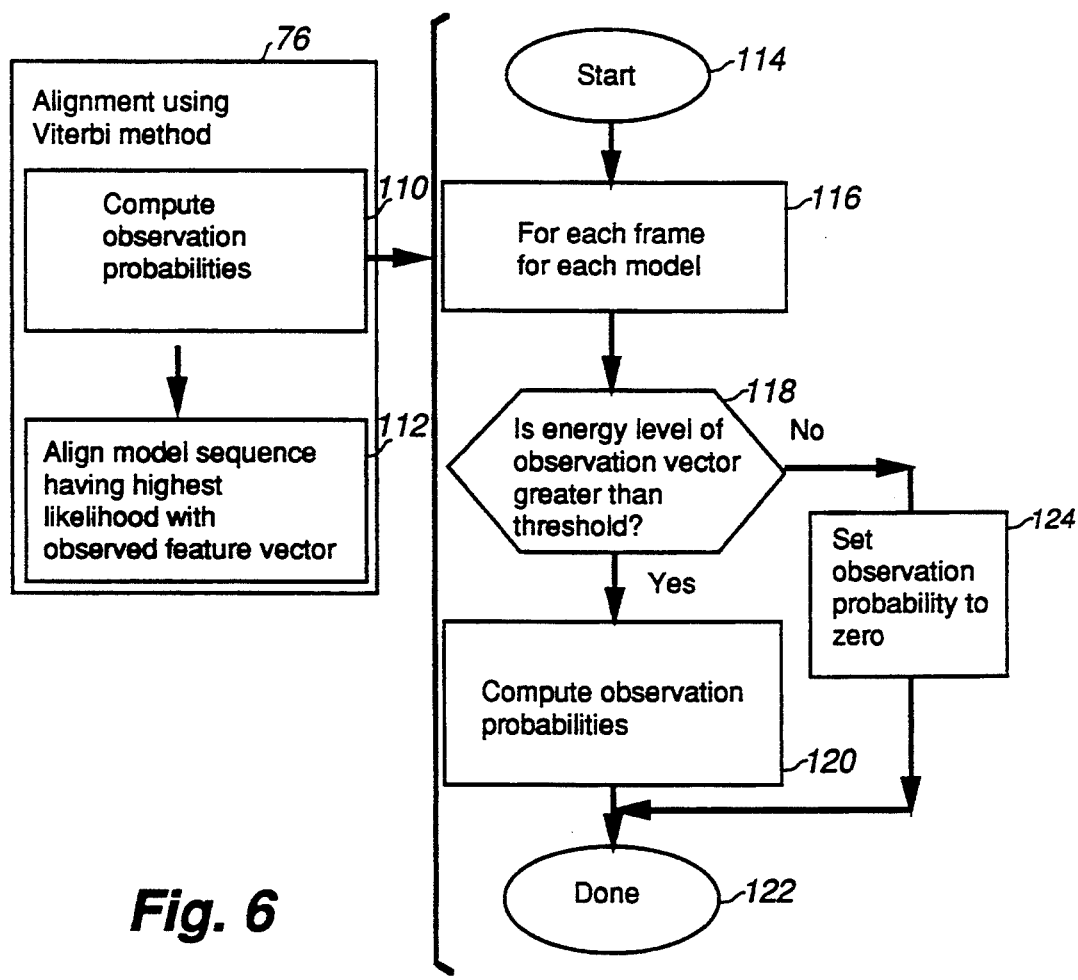
FIG. 6 illustrates in a flow chart the method of including energy thresholds for the observed vector in the Viterbi training method in accordance with an embodiment of the present invention.

Referring to FIG. 6, there is illustrated in a flow chart the method of including energy thresholds for the observed vector in the Viterbi training method. The box 76 of FIG. 3 is subdivided into two boxes 110 and 112. The box 110 computes observation probabilities and the box 112 aligns the phoneme model sequence with the observed feature vector. The method begins with 114. A box 116 initiates the method by examining each phoneme model, frame by frame. A decision box 118 compares the frame energy level with the phoneme model energy threshold. If the vector energy is greater than or equal to the threshold, a box 120 computes the observation probabilities as in the standard Viterbi method. If the vector energy is below the threshold, a box 24 sets the probability to zero. The method ends with 122.

The energy thresholds for different phonemes are outlined as follows (noise represents energy level for noise on the line):

1. Vowel thresholds (except /ə/):
   i. for vowel in first four phonemes, energy>noise+10 dB,
   ii. else if utterance>10 phonemes, vowel in last 4 phonemes, energy>noise+1 dB,
   iii. else energy>noise+6 dB.
2. /ə/ thresholds:
   i. if in first four phonemes, energy>noise+6 dB,
   ii. else if utterance>10 phonemes, /ə/ in last 4 phonemes, energy>noise+1 dB,
   iii else energy>noise+3 dB.
3. /l r j w/ thresholds:
   i. if utterance>10 phonemes, phoneme in last 4 phonemes, energy>noise+1 dB.
   ii. else energy>noise+3 dB.
4. if /f v θ ð h/ in first four phonemes, energy>noise+1 dB.
5. if /s z n m ŋ/, energy>noise+1 dB.
6. /ʃ ʒ/ thresholds:
   i. if utterance>10 phonemes, phoneme in last 4 phonemes, energy>noise+1 dB,
   ii. else energy>noise+3 dB.

Note that some of the energy thresholds are dependent on phonemic context. These energy thresholds are applied during Viterbi training. During Viterbi training, the likelihood of every speech frame for all possible transitions in the phoneme models is computed. For speech frames whose energies are lower than the energy threshold for that phoneme, the likelihood of that speech frame for all possible transitions through that phoneme is set to zero. Application of such energy thresholds during training results in phoneme boundaries which are much more reasonable. The phoneme models thus obtained result in significant improvement in recognition accuracy.

The use of energy constraint has been described in connection with the Viterbi method, however, these constraints will also work with the so-called Forward-Backward training method.

During training, another method of improving the mapping of phoneme models to speech segments is by preclassifying of speech into voiced, unvoiced, or silence categories. Then the phoneme models are constrained to map to speech segments of a specific category. These constraints can be imposed in the same fashion as the energy constraints during Viterbi training. Such constraints improve the mapping of phoneme models to speech segments during training, resulting in phoneme models which improve recognition accuracy significantly.

Figure 7:
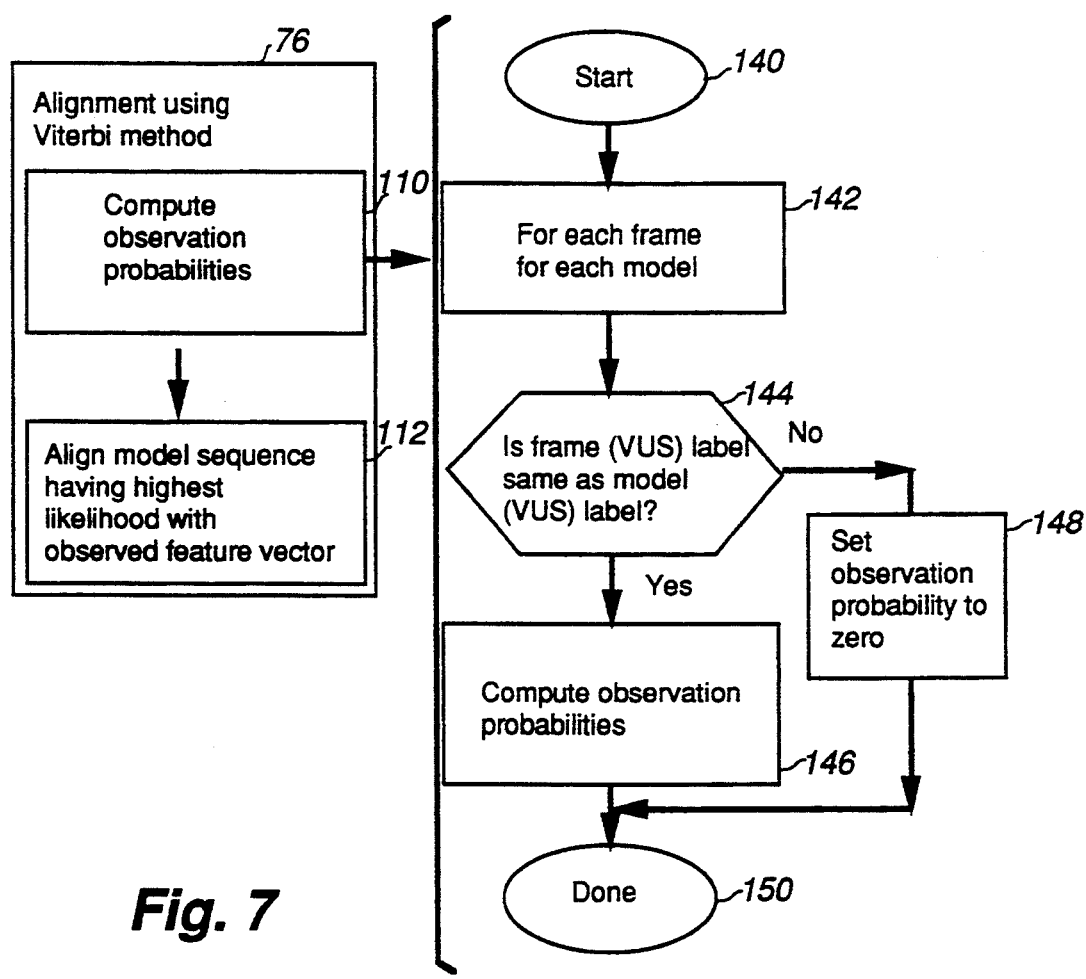
FIG. 7 illustrates in a flow chart the method of including voiced unvoiced, and silence classifications in the Viterbi training method in accordance with an embodiment of the present invention.

Referring to FIG. 7, there is illustrated in a flow chart the method of including voiced, unvoiced and silence classifications in the Viterbi training method. As in FIG. 6, the box 76 of FIG. 3 is subdivided into two boxes 110 and 112. The method begins with 140. A box 142 initiates the method by examining each phoneme model, frame by frame. A decision box 144 compares the frames (VUS) label with the phone model (VUS) label. If the labels are the same a box 146 computes the observation probabilities. If the labels differ, the observation probability for that frame is set to zero. The method ends with 150. Thus, the computation of observation probabilities computed at 110 in the Viterbi method are computed in accordance with steps 140 through 150.

One issue here is how to classify speech into voiced, unvoiced or silence category. A voiced/unvoiced/silence (VUS) classifier known in the art from the article entitled "Application of an LPC Distance Measure to the Voiced-Unvoiced Silence Detection Problem" by L. R. Rabiner and L. M. R. Sambur (1977) IEEE Transactions on Acoustics, Speech, and Signal Processing, ASSP-45(4), 338–343, has been shown to perform well. This classifier is used with some additional improvements. The classifier may provide erroneous classification when a strong fricative has high energy. Often segments are classified as voiced even though the correct decision should be unvoiced. A pitch detector based on the well known average magnitude difference function (AMDF) algorithm published in the article entitled "Average magnitude difference function pitch extractor", by M. J. Ross et al. (1974), IEEE Transactions on Acoustics, Speech and Signal Processing, ASSP-22, 353–362 applied to linear predictive coefficients (LPC) residual signal has been used in order to correct these errors.

The question is what mapping between phoneme models and speech segments classified as either voiced, unvoiced, or silence, would result in improved mapping of phoneme models to speech segments. Use of linguistically motivated mappings (vowels, nasals, voiced fricatives mapping to voiced segments, unvoiced fricatives mapping to unvoiced segments, silence mapping to silence segments, etc.) would actually result in additional errors in mappings between phoneme models and speech segments. The reason is that the VUS classifier makes many errors (approximately 5% of the speech segments are misclassified). In order to eliminate mapping errors due to the misclassifications by the VUS classifier, mappings are formulated that take into account errors caused by the VUS classifier. Many of the VUS classification errors are predictable (for example, phoneme /i/ and phoneme sequence /ju/ are classified as unvoiced in many instances). These problems are mitigated by including the performance of the VUS detector in the mappings. The mapping used during Viterbi training of the phoneme models is as follows:

1. vowels and /l r w/:
   i. map to voiced or unvoiced speech segments in initial position or if in last four phonemes when the total number of phonemes in the utterance is greater than 10.
   ii. map to voiced segments everywhere else, except some phonemes map to voiced or unvoiced segments in special contexts:

a. phoneme /r/ when followed by a vowel and preceded by /t/ or /f/.
   b. phoneme /w/ when preceded by /k/.
   c. phoneme /i/ when followed by inter-word silence.
   d. phoneme /I/ when preceded by /d/ or inter-word silence.
   e. phoneme /ε/ when preceded by inter-word silence.
   f. phoneme /u/ when preceded by /j/.
   g. phoneme / ə / when preceded by /s/, /ʃ/, /r/, /d/, or inter-word silence.

2. phonemes /n m ŋ / are voiced or unvoiced if not in last four phonemes when the total number of phonemes in the utterance is greater than 10, otherwise voiced, unvoiced, and silence.

3. /j/ is always voiced or unvoiced.

4. The intervocalic silence is always unvoiced or silence.

Note that the initial vowel can be either voiced or unvoiced. This mapping is necessary as it has been observed that initial 20 ms of the utterance-initial vowel is classified as unvoiced in many instances. The utterance-initial and utterance-final silence models can map to speech segments labelled as either voiced, unvoiced or silence. This is due to the fact that impulse noise, and sometimes strong breath or aspiration noise can be classified as voiced or unvoiced. When the word consists of ten or more phonemes, it has been observed that the last three or four phonemes get classified as unvoiced, even though they are really voiced. This is evident from the mappings shown above, where the last four phonemes can map to unvoiced segments, even though they are voiced. All the errors caused by the VUS classifier are reflected in the mapping rules. The mapping rules impose constraints on the VUS classifier that result in improvements in mapping phoneme models to speech segments.

The second part of the flexible vocabulary recognition system is recognition of an unknown utterance. In the present invention unknown utterances are converted to acoustical parameter vectors, for example cepstrum vectors. As described above, Markov models of the phonemes are trained for use during recognition.

The vocabulary is represented by a lexical network. Within the lexical network, each branch in the network represents a phoneme. Every path through the network must define a vocabulary member and all vocabulary members must be represented. Path merging may occur, but only if no over-generation or member deletion results.

Figure 8:
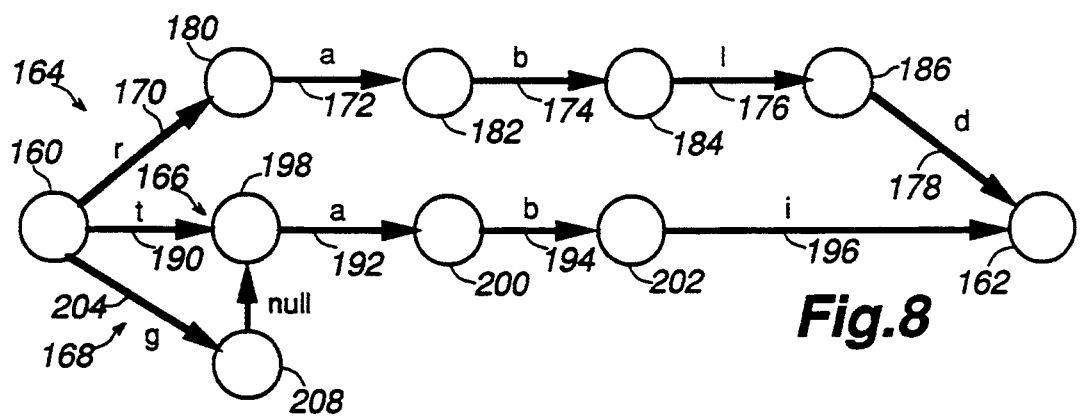
FIG. 8 graphically illustrates a lexical network for a vocabulary consisting of the words: rabid, tabby and gabby.

Referring to FIG. 8, there is graphically illustrated a lexical network for a vocabulary consisting of the words: rabid, tabby and gabby. The lexical network includes start and end nodes 160 and 162, respectively, and paths 164, 166, and 168. Each word in the vocabulary is represented by a path from the start node 160 to the end node 162. The path 164 (for the word rabid) consists of a sequence of branches 170, 172, 174, 176 and 178, interconnecting nodes 160 and 180, 180 and 182, 182 and 184, 184 and 186, and 186 and 162 respectively. Similarly, the path 166 (for the word tabby) consists of a sequence of branches 190, 192, 194 and 196, interconnecting nodes 160 and 198, 198 and 200, 200 and 202, and 202 and 162, respectively. The path 168 (for the word gabby) consists of a branch 204 representing g and a branch 208, a null branch which merges the path 168 with the path 166 at the node 198. Thus, the path 168 consists of a sequence of branches 204, 206, 192, 194, and 196 interconnecting nodes 160 and 208, 208 and 198, 198 and 200, 200 and 202, and 202 and 162, respectively.

The purpose of any speech recognition system is to convert speech into text. The recognition problem is usually formulated as one of finding the sequence of states in the hidden Markov chain whose posterior probability (given the acoustic observations) is maximal.

Two possible statistical speech recognition methods can be used: Viterbi recognition method (Levinson et al., 1983), and stack decoding or A* search method (Jelinek, 1976). Both these methods recognize the unknown utterance as the most likely path through a lexical network. In the present invention, the lexical graph has phoneme branches, and any complete path through the graph corresponds to a phoneme sequence of a complete utterance. The utterance could be a word or a sequence of words. It is well known in the art to use the Viterbi recognition method to find the most likely path through the lexical network. However, this method suffers from several drawbacks. Because it performs an exhaustive search, for phoneme-based recognizers with large vocabularies, the search space can be very large and the search prohibitively expensive, both in time and CPU power. A further limitation is it generates only one recognition hypothesis. Also, imposing constraints at the segment level (for example, duration constraints) causes a substantial increase in computations.

The principal alternative to the Viterbi method is the A* or stack decoding method. This method was applied to speech recognition by IBM in the 1970's, using the formula dictated by the Bayes decision rule to score recognition hypotheses (Jelinek, 1976). The principal advantage of the A* method is that multiple recognition hypotheses can be generated very easily. The principal disadvantage is that it will be inefficient unless partial paths through the lexical network can be estimated with sufficient accuracy.

In accordance with the present invention a method is provided to estimate scores for partial paths while reducing computational burden. To understand the need for these partial path estimates, a brief discussion of the A* search method is provided. The A* search method is an optimal search procedure to find the best path through a lexical network. The A* search method searches through a lexical network by scoring partial paths, and extending the most promising partial paths, until a complete path with the highest score is obtained. In scoring a partial path, an estimate score is used. The estimate score corresponds to an estimate of the score for the most likely extension of the partial path to form a complete path. The closer the estimate score is to the most likely path extension (but not less than this score), the faster is the search. The article by P. Kenny et al., entitled "A*—admissible heuristics for rapid lexical access", Proceedings of 1991 International Conference on Acoustics, Speech and Signal Processing, pp. 689-692, provides a mathematical explanation of the method of searching the lexical network and is hereby incorporated by reference.

A most precise method would be to use the Viterbi method together with the lexical network to compute the estimate scores. However, this would result in the same computing complexity as that of the Viterbi recognition method. Reduction of the computing required can only be accomplished by basing the estimator on a much smaller network. The lexical network can be reduced by partitioning its nodes into equivalence classes. If fewer equivalence classes are used, then the computing involved in estimating the partial path scores becomes smaller, but the search becomes less efficient. When more equivalence classes are used, the search is more efficient, but estimator requires more computation. An effective compromise is an equivalence network with two phone equivalence. This results in significant reduction in computing as compared to the Viterbi recognition method.

Each branch in the network used for the estimator does not need to uniquely define a vocabulary member. That is, the network may over-generate vocabulary members; its paths can define more vocabulary members than there are in the original vocabulary. As long as there is a mapping between the full and the reduced network, any rules may be used in generating the reduced network. In the present invention, the rule used in defining the reduced network is as follows:

all sequences of three consecutive phonemes found in the original vocabulary are present in the vocabulary generated by the reduced network.

Hence, this network is termed the trigram (or triphone) network. The trigram network is necessary for a "two phone look ahead" technique that results in reduced computing requirements. One may easily determine a mapping function between the full and reduced networks by defining adjacent phoneme sequences.

It should be noted, though, that there are some minor differences between the construction of this network and that of the full vocabulary network. First, the trigram network maps the phoneme models to the nodes rather than to branches. Second, each node in the trigram carries a phoneme pair label. Only the model of the second member of the pair is used in the probability calculations, hence the node is similar to a branch in the full network.

Figure 9:
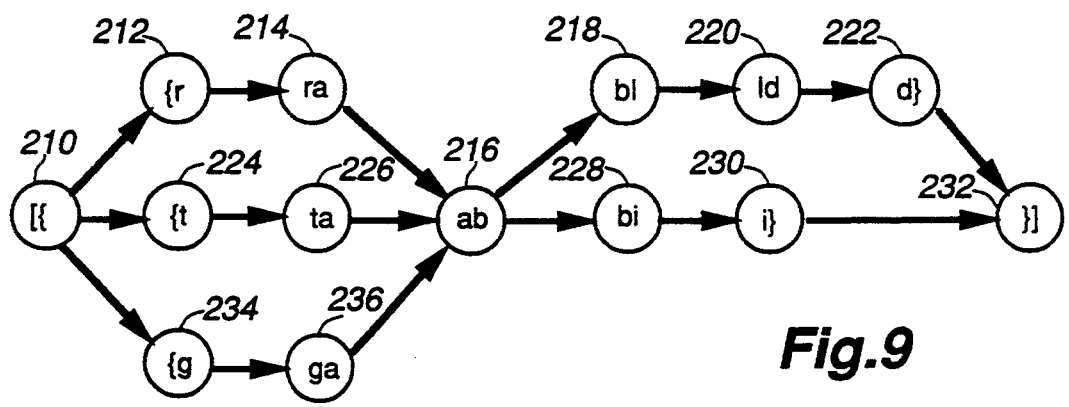
FIG. 9 illustrates a trigram network corresponding to the lexical network of FIG. 8.

Referring to FIG. 9, there is illustrated a trigram network corresponding to the lexical network of FIG. 8. The trigram network includes biphone nodes which begin with a starting node 210 for the phoneme {(initial-silence). For each complete path (164, 166, and 168) in the lexical network there is also a complete path in the trigram network. The path 164 (rabid) maps to the path consisting of nodes 210, 212, 214, 216, 218, 220, 222, and 232. The path 166 (tabby) maps to the path consisting of nodes 210, 224, 226, 216, 228, 230, and 232. The path 168 (gabby) maps to the path consisting of nodes 210, 234, 236, 216, 230 and 232. Unlike the lexical graph in which each complete path corresponds to a word in the vocabulary, paths exist in the trigram network that form non words for example nodes 210, 212, 214, 216, 228, 230, and 232 form rabby. Similarly, nodes 210, 234, 236, 216, 218, 220, 222, and 232 form gabid.

The Viterbi search over the trigram network is used to generate the estimator function required for the A* search. Essentially, an estimate is required for the probabilistic distance from each node (in the full lexical network) to the beginning of the utterance (the A* search goes backwards through the utterance) from each point in time. The trigram search, then, must generate the probabilities for these estimates.

In fact, what the trigram search will do is generate accurate numbers of these probabilities for the over-generated vocabulary. The reason that they are only estimates for the complete network is that there is not a one-to-one mapping between the nodes in the trigram network and the branches in the lexical network.

The "two-phone look ahead technique" proceeds as follows:
a) from a currently expanded phoneme in the lexical network, for example phoneme (i) 196 of FIG. 8;
b) look "ahead" (A* search goes backwards through lexical network) two phonemes to see (b) 194 and (a) 192 of FIG. 8 thus an estimate is required for (a b);
c) referring to the trigram network find a node for a b which is the node 216 of FIG. 9;
d) estimate scores for this node are available for all frame times, thus the estimates for a specific time may be obtained. (The calculation and storage of the estimates is described below.).

To track the best cumulative probability of each state for each time increment, a two dimensional array is constructed, where one axis denotes time and the other enumerates the states. This array, called a Trellis, has dimensions States$_{total}$×Time$_{max}$.

Figure 10:
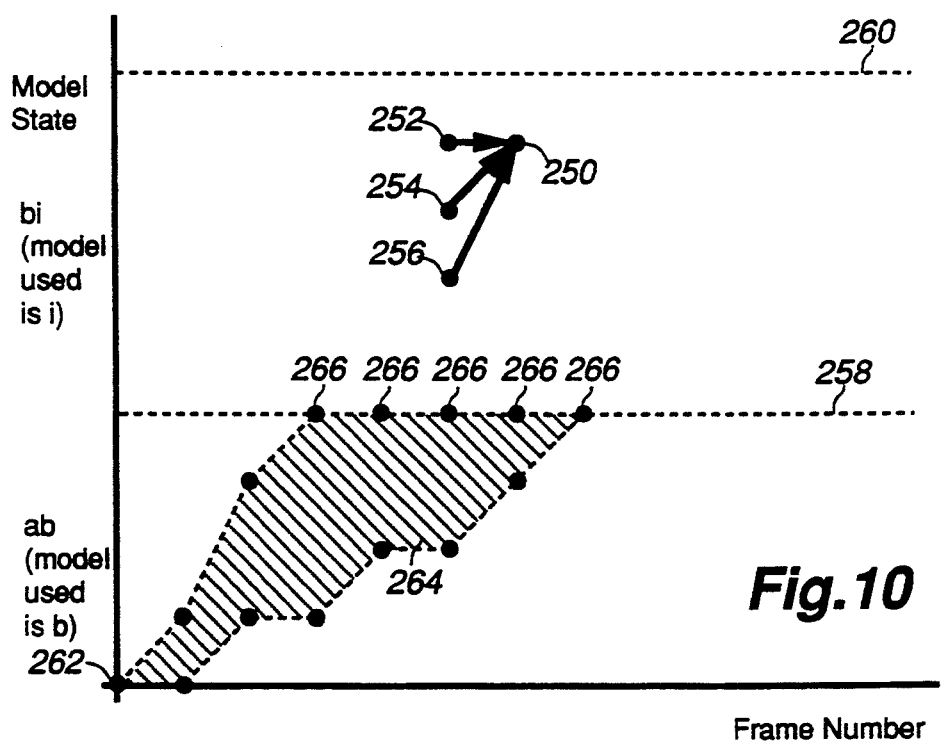
FIG. 10 graphically illustrates a trellis for storing the best cumulative probability of each state in the trigram network.

Referring the FIG. 10, there is illustrated a trellis for storing the best cumulative probability of each state. The trellis shows a state, $S_{m,t}$, 250, and three previous states $S_{m,t-1}$, 252, $S_{m-1,t-1}$, 254, and $S_{m-2,t-1}$, 256. The three previous states 252, 254, and 256 represent the self, next state, and skip state transitions of the phoneme Markov models.

FIG. 10 also plots phoneme boundaries 258 and 260 for biphones ab and bi respectively. Starting at an input state 262, a path 264 for the phoneme b of the biphone ab may diverge resulting in several trellis output states 266 at the phoneme boundary 258. The accumulated transitional probabilities for these trellis output states are stored, as described above, for use as estimates for the A* search method. The trellis output states are also used as trellis input states for the next phoneme (i) of biphone bi. For simplicity, only a single input state is shown for the biphone ab.

The Viterbi recognition method is an iterative method for calculating the cumulative probabilities required at every point on the Trellis. Each state $S_m$ at a given time t has a number of allowable transitions leading to it from certain states at t−1. Typically, $S_{m,t-1}$, $S_{m-1,t-1}$ and $S_{m-2,t-1}$ can lead to $S_{m,t}$. These transitions correspond to a self loop, previous state transition and skip state transition. Each state has a certain cumulative probability at t−1 and each one of these transitions has a certain probability of occurring given the cepstral vector observed. In order to determine the best cumulative probability for $S_{m,t}$ only the probability of each possible transition needs to be evaluated and summed to the corresponding previous cumulative probability, and the one with the best result chosen.

Note that the time is not measured in seconds but rather in terms of frames with one observed cepstral vector per frame. That is, each observed vector is an increment on the time axis in the Trellis array. For the Viterbi search of Trigram network, the Trellis dimensions are of the order of 5000 states by 256 vectors.

The calculation for the full Trellis starts at t=0 and fills in the array one "time increment" at a time (if the transitions chosen are recorded, a description of the path taken would be obtained). The complete Viterbi recognition method for the Trellis, then, is as follows:

1) Set all log probabilities in the Trellis to −∞, except the state defined as the beginning of the utterance. Set this one to 0.
2) For time from 0 to the end of utterance For all states in all possible nodes of the trigram network.
   a) get the cumulative probability at t−1 of all possible previous states leading to $S_{m,t}$ and the associated transition probabilities,
   b) calculate all possible cumulative probabilities for $S_{m,t}$,
   c) choose the one resulting in the best score for $S_{m,t}$, and store it in Trellis.

In an embodiment of the present invention, the FVR system uses cepstrum vectors, with a dimension of 15 as input. The A* search method itself, however, is not dependent on the type of data input; in fact, it may use any type of speech vector as input. Mathematically, the cepstral vectors are computed in a known manner, by dividing the speech spectrum between 0 and 4 kHz into 20 channels spaced according to the mel scale of frequencies. The energy in each channel is computer by summing a triangularly weighted spectrum located at the center of the channel. The cepstral coefficients are computed by taking the cosine transform in accordance with the following equation:

$$C_i = \sum_{j=1}^{20} E_j \cos\left(i(j-0.5)\frac{\pi}{20}\right), i = 1, 2, \ldots, 7$$

where $E_j$=log channel energy in the jth filter. The first two and last two cepstral vectors are multiplied by 0.01. Further details concerning cepstral vectors may be gleaned from U.S. Pat. No. 4,956,865, issued Sep. 11, 1990 to M. Lennig et al., and assigned to Northern Telecom Limited the entire disclosure of which is incorporated by reference. Conveniently, one vector is generated every 12.75 ms. This feature vector of dimension 15 is the speech input which drives the A* search method.

As previously stated, the A* search method requires estimates of the probability from each node to the beginning of the utterance for all time. It does not require, however, estimates for internal state transitions within each node. Therefore, although the trigram search must calculate the probabilities for all Trellis elements, it need only store (for the A*) the exit states 266 of each node for all time (i.e. a reduced Trellis).

Figure 11:
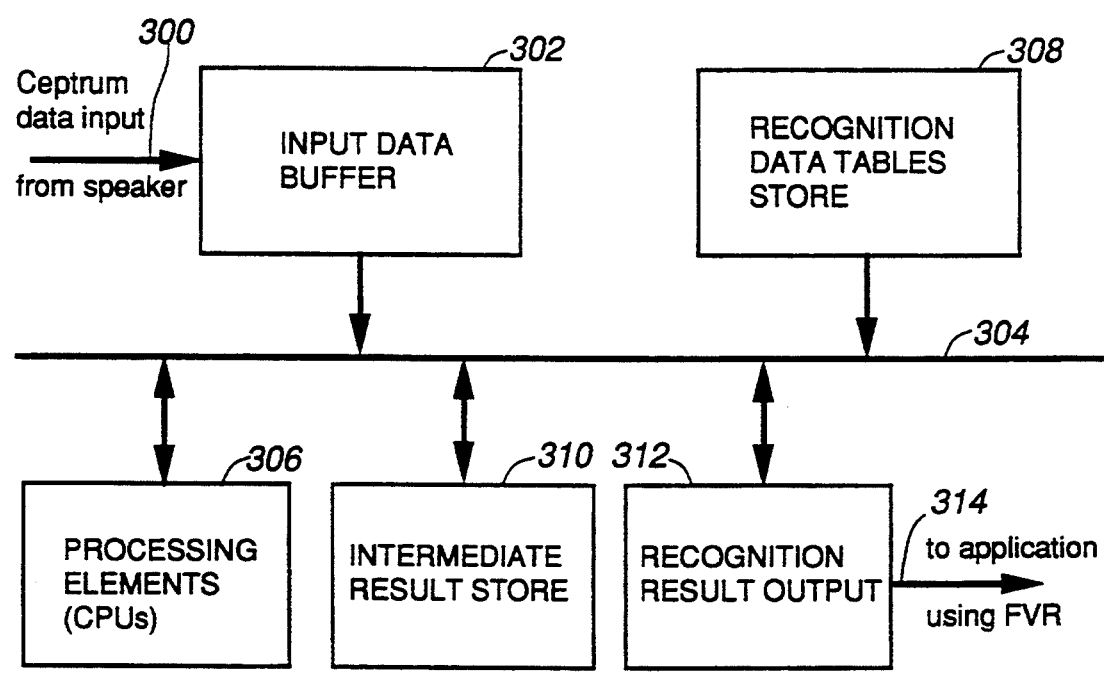
FIG. 11 illustrates a functional block diagram of the flexible vocabulary recognition system in accordance with an embodiment of the present invention.

Referring to FIG. 11, there is illustrated a functional block diagram of the flexible vocabulary recognition (FVR) system. An input 300 accepts cepstrum data from known speech processors, for example function blocks 10 through 20 of FIG. 1 in the above-incorporated U.S. Pat. No. 4,956,865.

The cepstrum data accepted is stored in an input data buffer, 302. The input data buffer 302 is connected to other system components by a bus 304. These system components connected to the bus 304, include processing elements (CPU) 306, a recognition data tables store 308, an intermediate result store 310, and a result output device 312. The result output device 312 includes an output 314 to an application (not shown in FIG. 10) coupled to the FVR system.

Figure 12A:
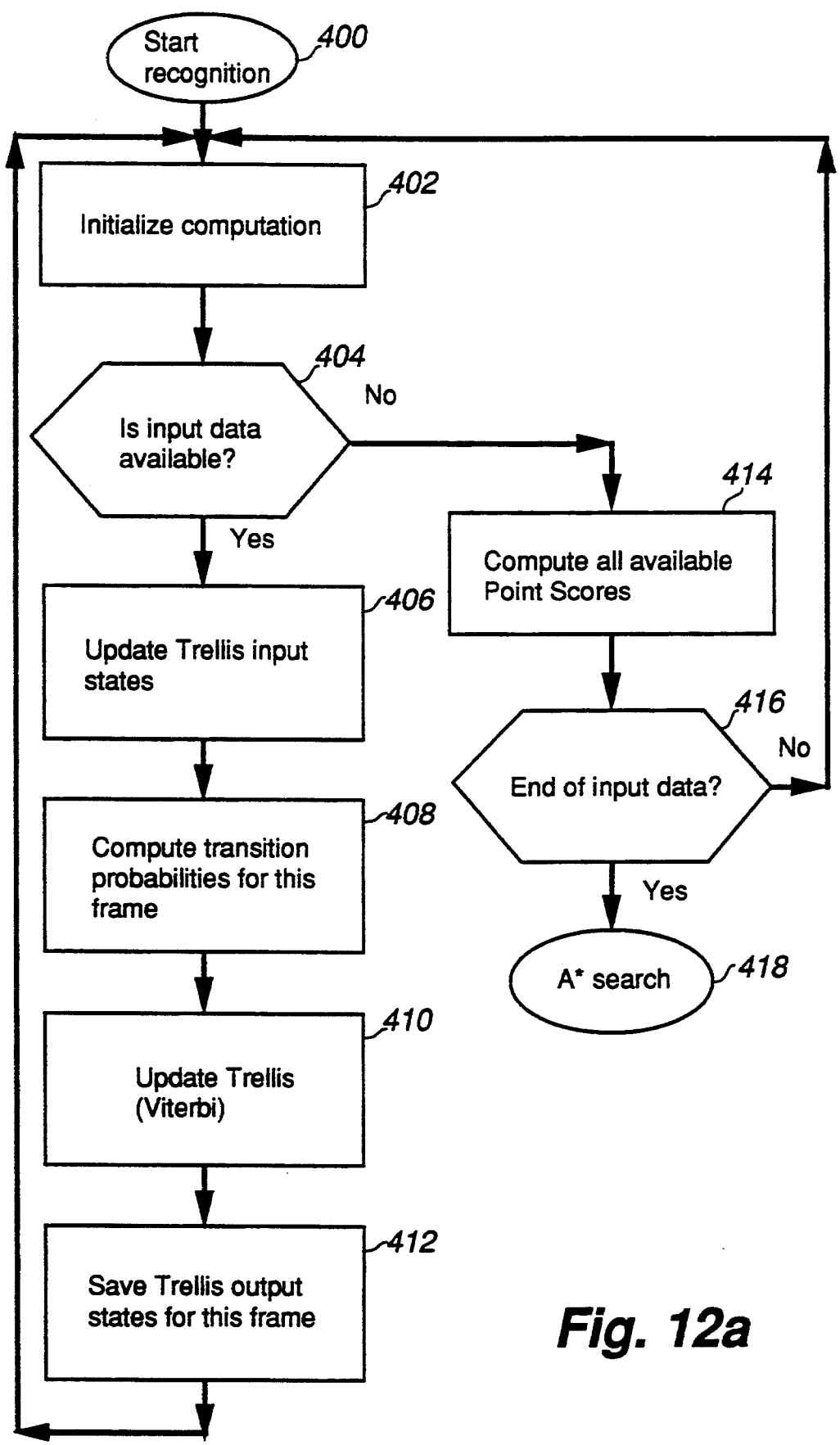
FIG. 12a illustrates in a flow chart the sequence of frame synchronous steps executed by the speech recognition system of FIG. 11.
Figure 12B:
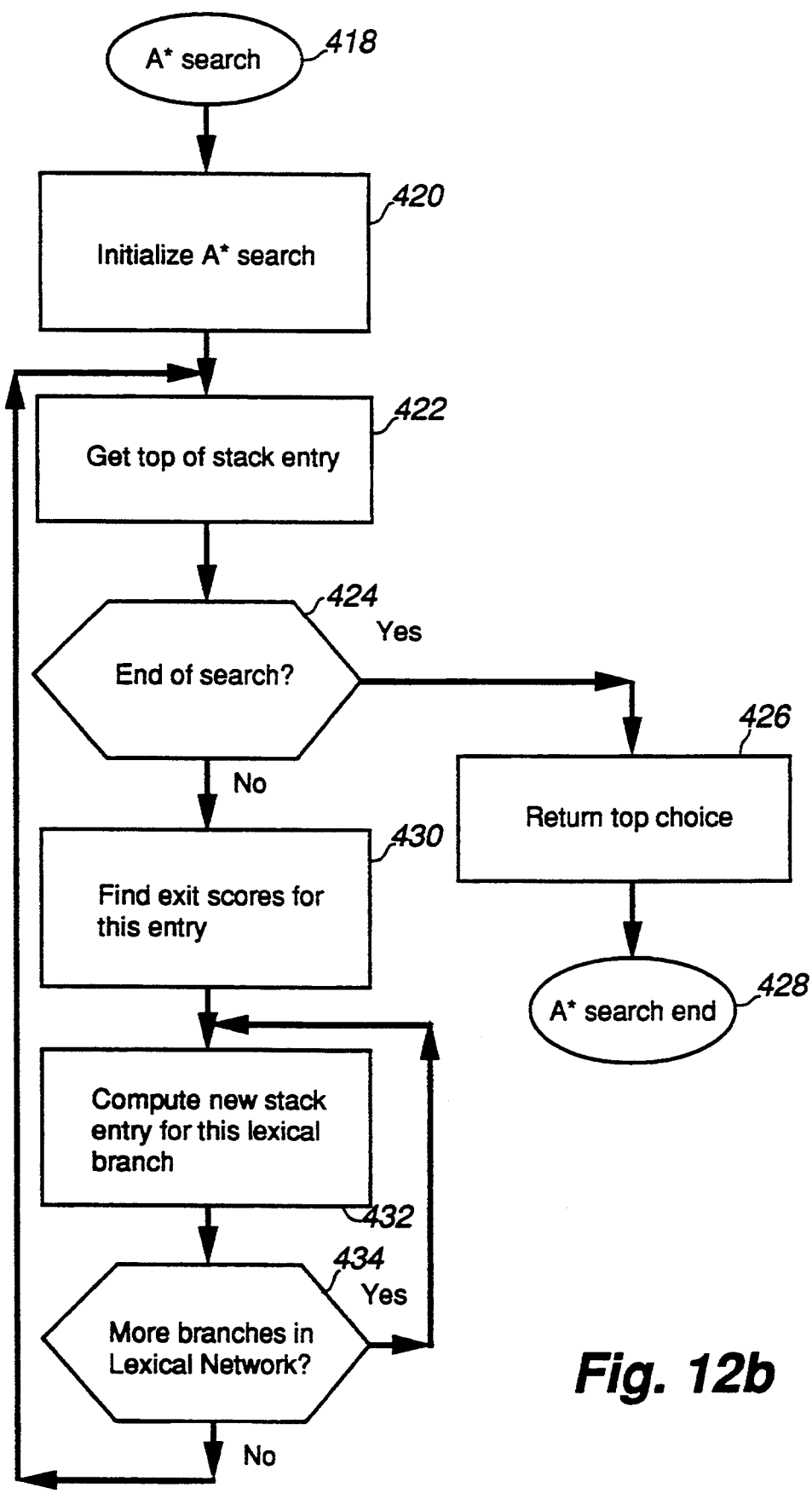
FIG. 12b illustrates in a flow chart the sequence of steps of the A* search executed by the speech recognition system of FIG. 11.

The operation of the FVR system is illustrated as flow charts in FIG. 12a and FIG. 12b. The sequence of frame synchronous steps executed by the FVR system is illustrated in FIG. 12a. The frame synchronous operation begins with blocks 400 and 402. Following the production of cepstrum vectors from the input speech in a known manner, the presence of the cepstrum vector is determined by a decision block 404. On a frame-by-frame basis, a block 406 updates trellis input states for the Viterbi search through the trigram network.

This step is followed by a block 408 representing the calculation of transitional probabilities for all phoneme model transitions given the input cepstrum vector frame. The resultant probabilities are then stored in the intermediate result store 310 of FIG. 10. A step of updating the trellis is represented by a block 410. This step is followed by saving trellis output states from this frame for all phoneme boundaries as represented by a block 412. The trellis output states are used, for the next frame, to update trellis input states at the block 406.

Once all the input data has been processed as determined by the decision block 404, a block 414 computes all point scores at a block 416, for each phoneme model given the input cepstrum vector. (Point scores are described in detail in conjunction with FIG. 13.) The computation continues until completed for all input data as determined by a decision block 416. The frame synchronous operation then initiates the A* search method 418 as illustrated in FIG. 12b.

For each cepstral vector received, the following are the steps to the trigram search:

1) Compute Transitional Probabilities (408) Calculate the probabilities associated with each transition, given the input vector. This consists of:
   a) multiplying the input vector by the model's (rotated) covariance matrix,
   b) calculating the magnitude (norm) of the result,
   c) for each transition within the model, determining which mode (or mixture) results in the best transition probability. This calculation uses the results of (a) and (b) and each mode's mean and weight.

2) Trellis Update (410) This step determines the best transitions and cumulative probability within each node. For each state in the node:
   a) get the cumulative probability at $t-1$ of all possible previous states leading to $S_{m,t}$ and the associated transition probabilities (calculated in step 1),
   b) calculate all possible cumulative probabilities for $S_{m,t}$,
   c) choose the one resulting in the best score for $S_{m,t}$, and store it.

3) Save Trellis Output States (412) Save the scores for the exit state of all nodes. These are the estimators required for the A* search.

4) Update Trellis Input/States (406) This step propagates exit state scores from all nodes to the entrance states of attached nodes if they are better than the score currently stored in that state. For each node:
   a) determine all branch nodes to which this node attaches,
   b) If the cumulative probability of the last state in this node, $P_{last-state}$, is greater than that of the first state in the attached node, $P_{first-state}$, replace $P_{first-state}$ with $P_{last-state}$.

Note that this is really part of the full Trellis update, but the task has been divided into two separate steps (2 and 3).

When the utterance has been completed and the estimators have been calculated, the A* portion of the search may be applied. For the A* search portion some commonly used data are point scores for the phonemes, estimates of the partial paths and a window of best scores is to be considered.

The A* search 418 is initialized to recognize an unknown utterance by a block 420, setting up a stack (or heap) to keep track of the path scores arranged in descending order of total score. A block 422 accesses the stack to retrieve the top entry. A block 424 determines if the search has ended. A yes response leads to a block 426 returns the top stack entry as top choice for recognition. This ends the A* search 428. If the search is not complete, a block 430 determines the five exit scores from the top entry and using the points scores for the phoneme being expanded, determines the best scores for a range of entry times for the phoneme. Using the best scores together with estimates for the partial paths obtained from the trigram network using the two phone look ahead technique, a block 432 computes a new stack entry. A block 434 determines if there are other one phoneme extensions in the lexical network beyond the currently expanded phoneme. A yes results in computation of new stack entries for each remaining branch. Otherwise the method is repeated beginning at a block 422. The steps represented by blocks 422, 430, 432 and 434 are explained in detail in conjunction with FIG. 14.

Figure 13:
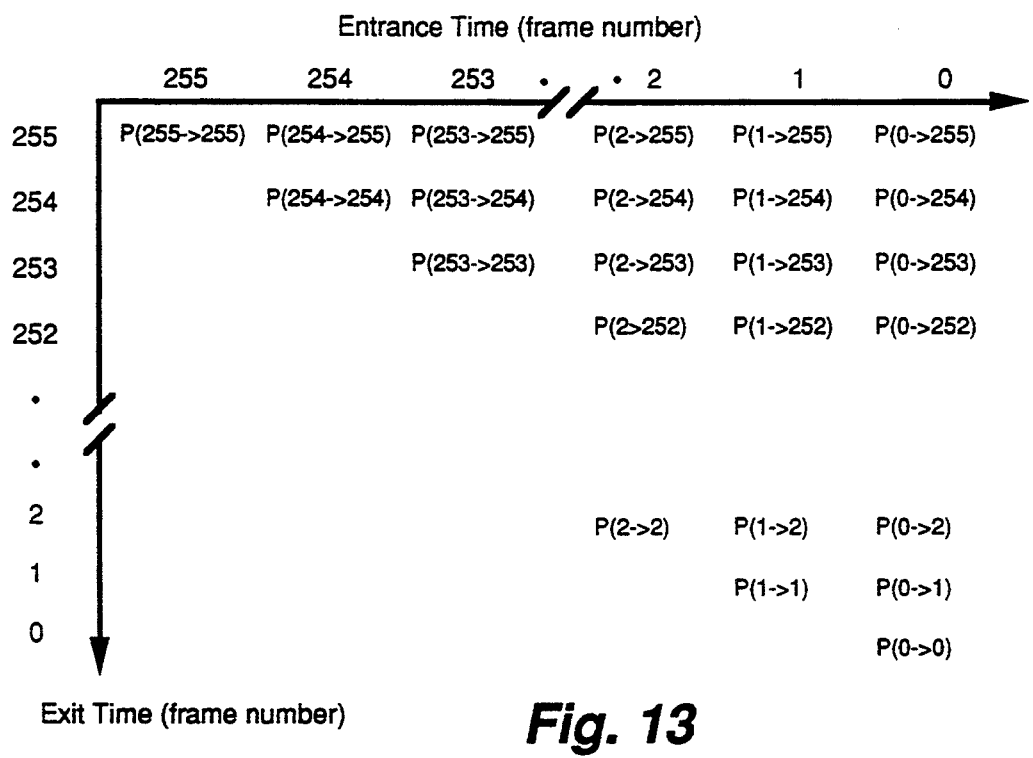
FIG. 13 graphically illustrates an array of point scores.

An array of point scores is constructed for each phoneme which represent the probability of traversing that phoneme between any two times, T1 and T2. The array is represented as a matrix where the vertical axis is the exit time and the horizontal axis is the entrance time, as shown in FIG. 13. These probabilities are used by the A* search method in determining the exact probability (or cost) of traversing a given branch in the lexical network between two given times. Point scores depend upon the sequence of observation vectors. This may be expressed in the equation form as follows:

$$P\left(O_{T_1}^{T_2} \middle| M\right) T_1 < T_2,$$

where $O_1^T$ is the utterance and M is the pheneme model

As described above in connection with FIGS. 8 and 9, while traversing a path in the A* search, estimates for the remainder of that path to the beginning of the utterance must be continually obtained. It is useful to think of the retrieval of these estimates being provided by an estimator function (although the implementation need not treat it as such). This function can be considered to take two major parameter sets:

1) The Next Two Phonemes in the Path The next two phonemes in the path of the lexical network determine which trigram node is to be used to obtain the estimate. Thus, the next two phonemes define the mapping between the lexical network and the trigram network. This process of using the next two phonemes in the path to obtain the estimate is termed "two phone look-ahead" (Note, though, that the A* search is actually going backwards through the network, so it is really "look-behind").

2) The Time (or Frame Number) Once the trigram node to be used is established, it is still necessary to define the time for which the estimate is required. This time is defined in terms of the frame number. How the time is obtained is described below in connection with FIG. 14.

For simplicity, the discussion thus far has been based on using a single point in time for determination of the estimate and true probability. In practice, however, there may be uncertainty that a phoneme boundary is placed optimally by the first positioning. Therefore, the A* search expands each phoneme from 5 exit times to allow for movement of the phoneme boundary around this window. Conveniently, for the present embodiment, the window has been set to the best 5 frames.

For the A* search, the probability of a given path through the lexical network is constructed of two components; the estimate for the remainder of the path, as provided by the two phone look ahead technique, on the trigram network and the exact probability calculated up to that point in the path. The object then is to continue to calculate the exact probability for the path which has the best total probability until the beginning of the utterance is reached.

Figure 14:
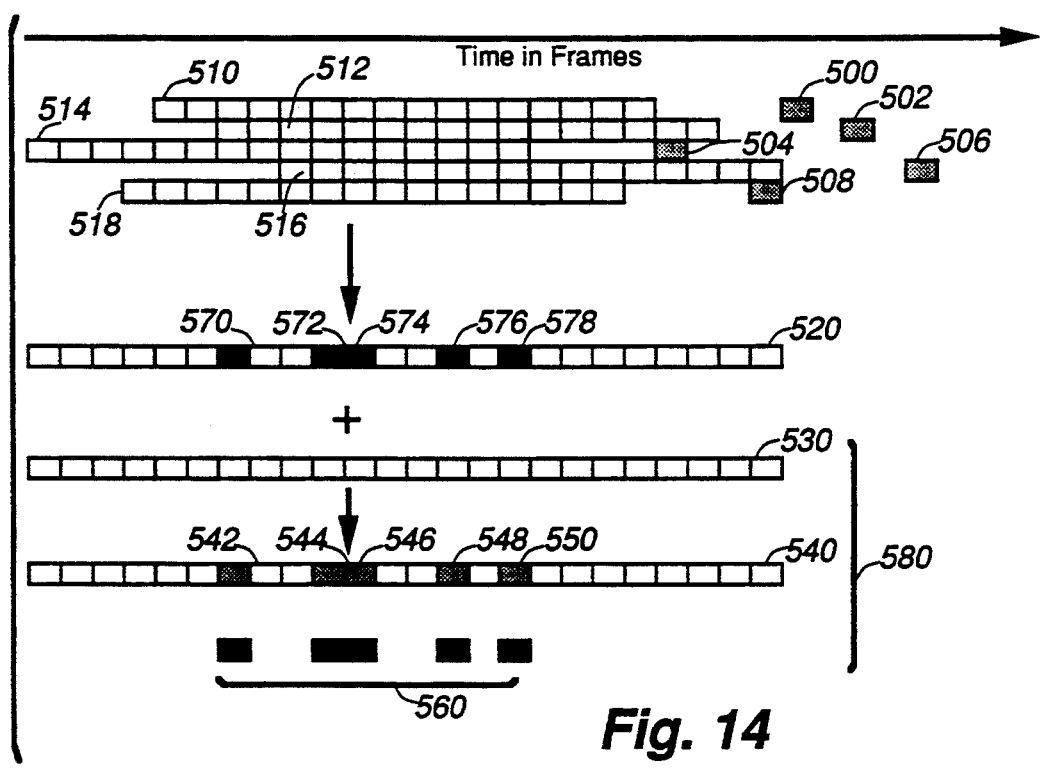
FIG. 14 graphically illustrates the A* search method.

Referring to FIG. 14, there is graphically illustrated a single phoneme expansion of the A* search method.

The current A* search stack entry consists of n probability scores, where n=5 for FIG. 14, (exit scores) together with the corresponding frame times, one phone sequence which includes the expanded phonemes and the two-phone of the look ahead + best total score. These five probabilities are represented as shaded blocks 500, 502, 504, 506 and 508. Their positions indicate the entry times for the previously expanded phoneme, and hence the exit times for the phoneme to be expanded (FIG. 12b, block 430). The last phoneme from the two-phone look ahead technique is expanded in the following manner. Boxes 510, 512, 514, 516 and 518 represent the point scores for the last phoneme from this pair. The point scores are given from the earliest to the latest entry times possible for the selected phoneme. The best score (point score + exit score) for each frame time is determined across the five possible as represented by boxes 520 (this corresponds to block 430 of FIG. 12b) These scores are added to the estimates for the next biphone pair taken over the range of time frames as represented by boxes 530. The total scores are represented by boxes 540. The shaded boxes 542, 544, 546, 548 and 550 represent the five best total scores. These provide the new stack entry determined by mapping boxes 560 back to 520. The highest total is kept as the best total score. The accumulated point scores of the boxes 540 corresponding to the five best scores 542, 544, 546, 548 and 550 are also saved. These are represented as shaded boxes 572, 574, 576 and 578 within boxes 520. For each, the accumulated total point score and the frame time is recorded. Storing the phoneme sequence completes the new stack entry. The new stack entry computation indicated by bracket 580, and corresponding to block 432 of FIG. 12b, is repeated for each branch in the lexical network beyond the currently expanded phoneme represented by boxes 520. Thus, all one phoneme extensions at a network branch are expanded.

The steps of the A* search method are as follows:
1) Initialization (420, FIG. 12b)
   a) Set up a stack which will keep track of the selection with the best total probability, where $P_{total}=P_{act}+P_{est}$. Set all log P's to 0.
   b) Submit all possible biphone (two phone) word endings to the estimator function and record all $P_{est}$. Select the one with the best probability for expansion, by accessing the top entry in the stack. Note that, for the end of the utterance, there is only one exit time and $P_{total}=P_{est}$.
2) Phoneme Expansion (430, 432, FIG. 12b) Calculation of the actual probability for a given phone is termed "phoneme expansion". The idea is to calculate the exact likelihood of the first phone in the biphone pair specified to the estimator function (the one closer to the end of the utterance). For the first phone in the biphone pair ... (boxes 500, 502, 504, 506, 508, FIG. 14) For every exit time in the window ... (boxes 510, 512, 514, 516, 518, FIG. 14) For all possible entrance times ... determine the entrance time which yields the best total actual probability (boxes 520, FIG. 14). $P_{act}(T2)=P_{act}(T1)+P(T1\rightarrow T2)$
3) $P_{total}$ Update Determine the new total probability for the path being expanded by:
   a) determining all possible "next biphone pairs" using the two phone look ahead technique on the trigram network and calling up the estimator function for each of these biphones, (step 580, FIG. 14)
   b) computing a new stack entry for each of the biphones. The five choices for $P_{act}$ (boxes 570, 572, 574, 576, 578, FIG. 14 corresponding to the five best total scores (542, 544, 546, 548, 550, FIG. 14) form part of the new stack entry.
4) Completion Repeat steps 2 and 3 until the top entry of the stack has been expanded to reach the beginning of the utterance.

Each entry in the stack has a score made up of estimate scores plus actual score. As several paths are expanded, those consisting of largely estimate scores will eventually appear at the top of the stack because their total score is higher than any other. However, once these are expanded they drop back down in position, only to reach the top on a subsequent reordering. To eliminate unnecessary expansions, the following technique is used:
   a) Keep track of the least number of frames used in estimate scores for any entry in the stack q for an utterance length s frames.
   b) before expanding the top entry, check its number of estimate scores r. If r is greater than the greater of (q+75 or q+s/2) discard the entry from the stack.

For example:
   For an utterance whose length s is 160 frames if the entry with the least estimate scores has q=10 frames then all stack entries with 10+160/2=10+80=90 estimate scores or more will be discarded (as they appear at the top of the stack).

An embodiment of the present invention includes other improvements for recognizing unknown utterances. As described above, an improved heuristic function for the A* search recognition method results in significant reduction in computing.

The recognition method is sensitive to the parameter vectors being used. For simplicity, only cepstral vectors have been discussed. However, two different parameter vectors may be used for speech recognition: cepstral parameters (for example in U.S. Pat. No. 4,956,865 incorporated by reference hereinabove) and line spectral pair (LSP) parameters (as described by Soong, F. K. and Juang, B. H. (1984), "Line Spectrum Pair (LSP) and Speech Data Compression", Proceedings of the 1984 IEEE International Conference on Acoustics, Speech and Signal Processing, pp. 1.10.1–1.10.4). Even though the recognition accuracy using either the cepstral parameters or the LSP parameters is about the same, the individual recognition results may be different. Only half the errors are common to both the parameter sets. This happens because the two parameters represent the speech spectrum differently: cepstral parameters represent the smoothed spectrum accurately, while the LSP parameters represent the spectral peaks accurately. In order to benefit from both the representations, an embodiment of the present invention uses the two parameters separately for recognition and takes a joint decision. When the recognized words using the two parameters are different, a joint likelihood is determined for each of these words using the two parameter sets and the one giving the highest likelihood is chosen as the recognized word. Combining the results of the two parameter sets in this manner results in significant increase in recognition accuracy.

Figure 15:
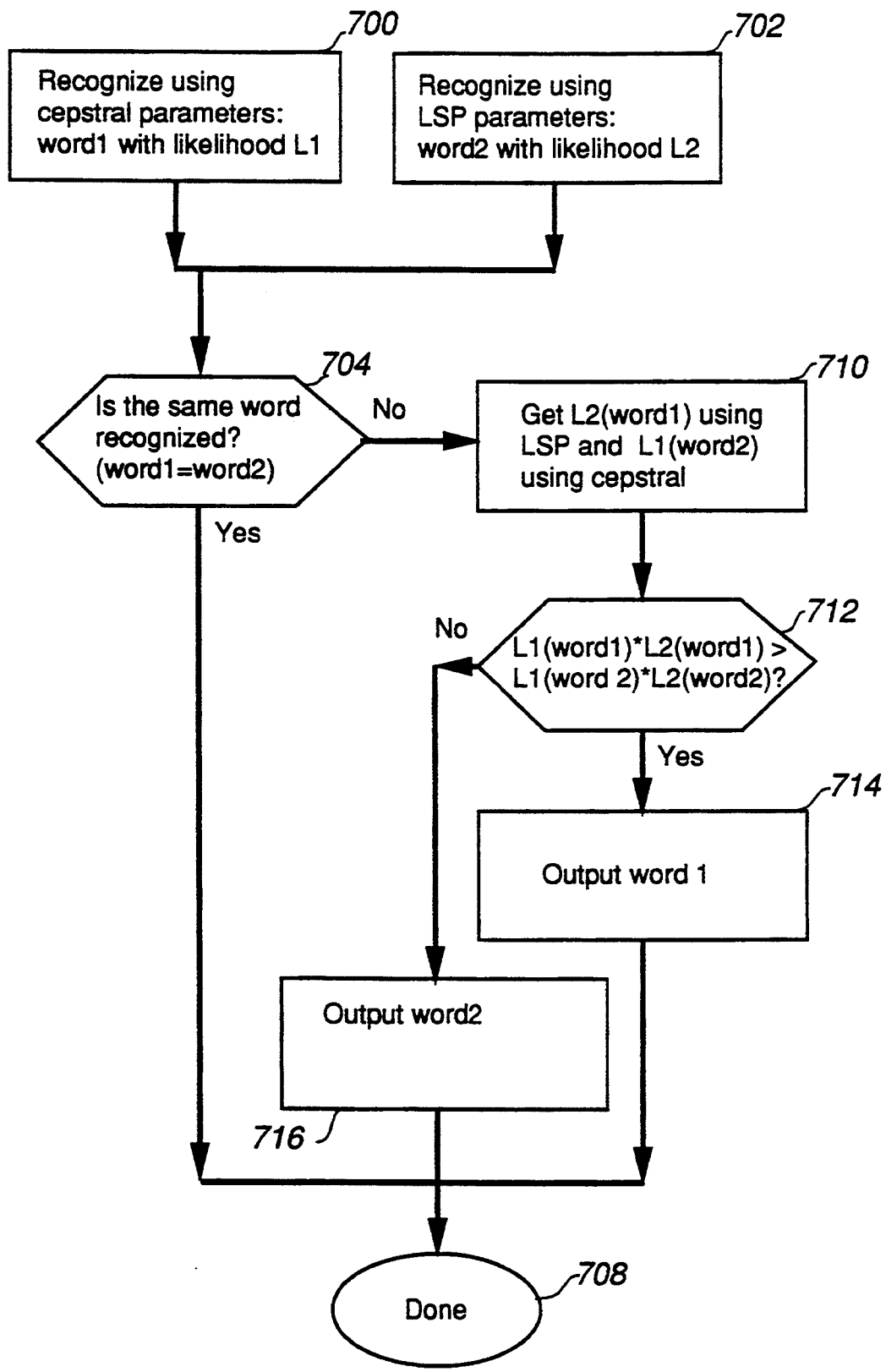
FIG. 15 illustrates in a flow chart the method of recognizing using both cepstral and LSP parameters in accordance with an embodiment of the present invention.

Referring to FIG. 15, there is illustrated, as a flow chart, the method of recognizing using both cepstral and LSP parameters, given separate recognition results for each type of parameter. Blocks 700 and 702 represent a recognition result using cepstral parameters and LSP parameters, respectively. The cepstral parameter recognition 700 results in an output word 1 having a likelihood $L_1(word\ 1)$. The LSP parameter recognition 702 results in an output word 2 having a likelihood $L_2(word\ 2)$. A decision block 704 determines if the results are the same, i.e., word 1=word 2. A yes means recognition is complete 708.

When the block 704 determines that the words are not the same, i.e. word 1≠word 2, additional likelihoods are computed by a block 710. The likelihood of word 1 is determined using LSP parameters, i.e. $L_2(word\ 1)$. Also the likelihood of word 2 is determined using LSP parameters, i.e. $L_1(word\ 2)$. Then a joint likelihood is taken by a block 712 by determining if:

$$L_1(word\ 1) \times L_2(word\ 1) > L_2(word\ 2) \times L_1(word\ 2)$$

A yes results in an output of word 1 by a block 714, while a no results in an output of word 2 by a block 716.

Figure 16:
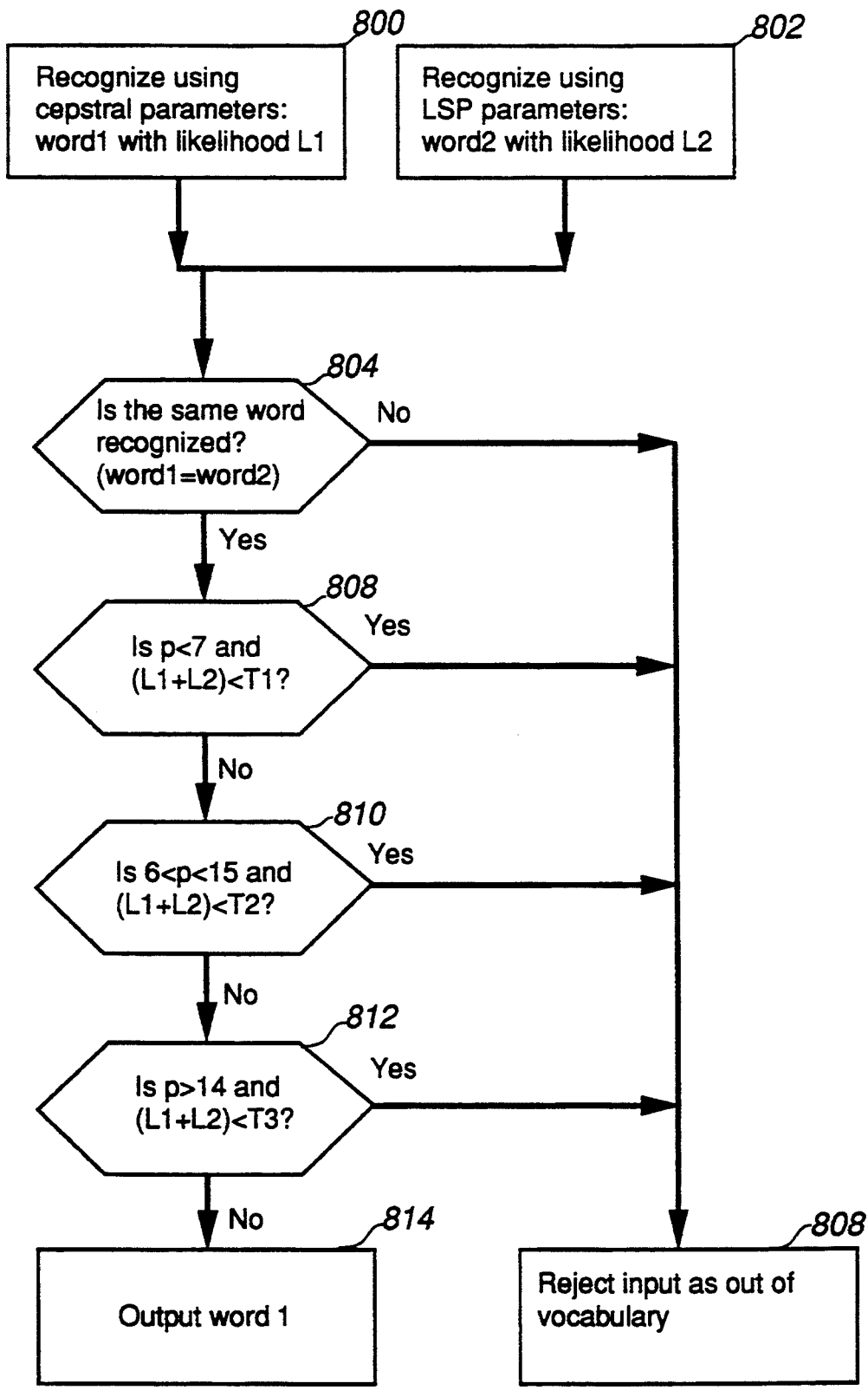
FIG. 16 illustrates in a flow chart the method of rejecting out-of-vocabulary utterances in accordance with an embodiment of the present invention.

A capability for rejection of out-of-vocabulary utterances is important in many applications. In accordance with an embodiment of the present invention a rejection method is provided for applications requiring medium size vocabulary (up to several thousand words). The recognition results from two different parameter sets are used to provide effective rejection of out of vocabulary words. The two parameter sets are cepstral parameters and LSP parameters. Referring to FIG. 16 there is illustrated as a flow chart, the steps of the rejection method. The rejection method works as follows. The cepstral parameters recognition 800 output word 1 and the LSP parameters recognition 802 output word 2. If the two parameters give different results, as determined by decision block 804, then the utterance is rejected as not belonging to the lexicon as represented by block 806. When the two results are the same, the utterance is rejected based on a likelihood threshold. Let the log likelihood per frame using cepstral parameters be L1, the log likelihood per frame using LSP parameters be L2, and the recognized phoneme sequence be p phonemes long. Then the recognized utterance is rejected if a block 808 determines $p<7$, and $(L1+L2)<T1$, or
a block 810 determines $6<p<15$, and $(L1+L2)<T2$, or
a block 812 determines $p>14$, and $(L1+L2)<T3$.

The thresholds T1, T2, and T3 are fixed thresholds. Typical values for T1, T2, and T3 are −3, −9, and −10, respectively. The use of likelihood thresholds for rejection with only one parameter set, yields poor rejection results. The combination of two parameters (LSP and cepstrum) for rejection, and the likelihood thresholds for rejection makes the rejection method work effectively.

It is well known to use hidden Markov models for digits (e.g., digit models) in digit-string recognition systems. An example of such a system is taught by Stephen E. Levinson et al., in U.S. Pat. No. 4,587,670 issued May 6, 1986 and reissued May 28, 1991 as U.S. Pat. No. Re. 33,597. Unfortunately, digit-models will not work with a phoneme based recognition system. Also the use of phoneme models for digits instead of digit-models may result in an increase in the digit-string recognition error rate.

In accordance with an embodiment of the present invention the phoneme base is expanded to include 33 allophone models used for digit recognition.

The use of context-dependent allophones does improve recognition accuracy. These allophones depend both on the left and the right contexts. A total of 33 allophone models and three silence models for digit-string recognition are used (see Table 2). A important aspect in digit-string recognition is the smoothing of the covariance matrix for silence models. The smoothing is performed by replacing the covariance matrix for silence models by the covariance matrix for phoneme /f/ as explained hereinabove with respect to covariance matrix substitution.

Similarly allophone models may be used for specific vocabulary words provided sufficient training data exists for the words. Specific words, such as yes and no, may be represented by allophone models to improve recognition accuracy.

TABLE 2

| Allophone models for recognizing digit-strings. | | | |
|---|---|---|---|
| phoneme | allophones | phoneme | allophones |
| /z/ | zI | /I/ | zIr sIk |
| /r/ | iro θri or | /o/ | ro for o |
| /w/ | wʌ | ʌ | wʌn |
| /n/ | ʌn ɔ n naj ajn | /t/ | tu et |
| /u/ | tu | /θ/ | θr |
| /i/ | ri | /f/ | fo faj |
| /aj/ | fajv najn | /v/ | ajv ɛvɔ |
| /s/ | sI ks sɛ | /k/ | Iks |
| /ɛ/ | sɛv | /ɔ/ | vɔn |
| /e/ | et | | |
| silence | inter-digit, utterance-initial, utterance-final | | |

Figure 17:
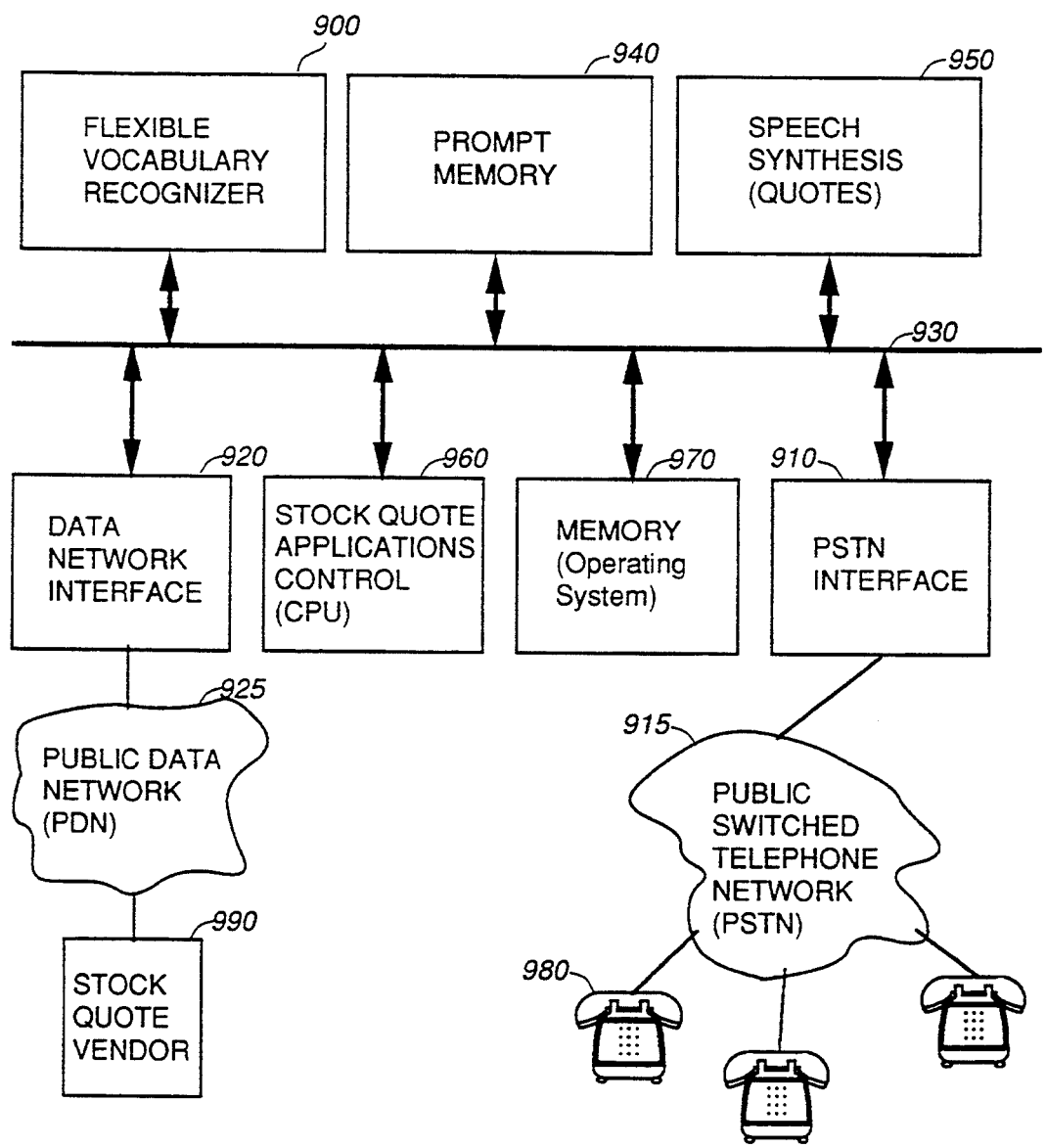
FIG. 17 illustrates, in functional block diagram, a stock quotation system in accordance with an embodiment of the present invention.

Referring to FIG. 17, there is illustrated a stock quote system in accordance with an embodiment of the present invention. The stock quote system uses the vocabulary size and flexibility of the present invention to advantage. The stock quote system includes an FVR 900, interfaces 910 and 920 to a public switched telephone network (PSTN) 915 and a public data network 925, respectively. The FVR 900, public data network interface 920 and the public switched telephone network interface 910 are interconnected via a bus 930. The stock quote system also includes a prompt memory 940 and a speech synthesizer 950, a stock quote application control processor (CPU) 960, and a memory 970. The prompt memory 940 stores digitized speech prompts used by the stock quotation system to prompt the customer. The speech synthesizer 950 converts quote labels and information to speech. The memory 970 stores this operating system used by the processor 960 to control the system.

In operation, a customer 980 desiring stock quotation information, places a call to the telephone stock quotation system number via the PSTN 915. A prompt stored in the prompt memory 940 announces the system reached and prompts the customer 980 for the name of the company for which a stock quotation is required. The response by the customer is recognized as discussed above by the speech recognizer 900. The speech system recognizer confirms the company name by providing a code to the speech synthesizer 950, which in conjunction with a prompt from the prompt memory 940, prompts the customer 980 for confirmation. Once confirmed, the code for the company name is passed via the bus 930, interface 920 and PDN 925 to a quote vendor 990. The quote vendor 990 decodes the code name and returns the stock quote in response to code data which is speech synthesized in the speech synthesizer 950 for response to the customer via the interface 910 and the PSTN 915.

While the telephone stock quotation system has been discussed in terms of dialling a specific number, such a system can also be used in conjunction with telephone answering systems or private branch networks to provide automatic switching of incoming calls. It is also well known to access computers via the PSTN.

What is claimed is:

1. A method of preparing phoneme models for recognition of speech received via telephone lines comprising the steps of:
   a) analyzing a training word to generate a frame sequence of acoustic parameter vectors representative thereof and obtaining a phoneme model sequence of the training word;
   b) providing a first set of model parameters representative of a sequence of state-transition models corresponding to each phoneme of the phoneme model sequence in the training word, the parameters including a mean vector and weighting factor for each transition and a covariance matrix for each model;
   c) computing a set of observation probabilities for each phoneme of the phoneme model sequence the training word and the first set of model parameters;
   d) aligning the frame sequence of acoustic parameter vectors with the sequence of state-transition models to provide a mapping therebetween representative of a path through the sequence of state-transition models having a highest likelihood;
   e) accumulating statistics for a plurality of utterances of said training word using the mapping of step d);
   f) generating a second set of model parameters representative of the sequence of state-transition models corresponding to each phoneme of the phoneme model sequence the training word;
   g) repeating step d) for the second set of model parameters;
   h) comparing the likelihood of the first and second sets of model parameters; and
   i) repeating step b) through h), replacing the first set of model parameters by the second set of model parameters when the second set of parameters provides at least a predetermined improvement in likelihood; and
   j) substituting the covariance matrix of a first model with the covariance matrix of a second model to provide a smooth covariance matrix thereby improving recognition accuracy for the first model.

2. A method as claimed in claim 1 wherein the first model represents a left silence phoneme ({) and the second model represents a phoneme (f).

3. A method as claimed in claim 1 wherein the first model represents a right silence phoneme (}) and the second model represents a phoneme (f).

4. A method as claimed in claim 1 wherein the first model represents a phoneme selected from the group consisting of ð, ʒ, ʊ, and the second model represents a phoneme ( ə ).

5. A method as claimed in claim 1 wherein the first model represents a phoneme (ε before r) and the second model represents a phoneme ( ə ).

6. A method of preparing phoneme models for recognition of speech received via telephone lines comprising the steps of:
   a) analyzing a training word to generate a frame sequence of acoustic parameter vectors representative thereof, having a parameter indicative of energy level for each frame of the frame sequence and obtaining a phoneme model sequence of the training word;
   b) providing a first set of model parameters representative of a sequence of state-transition models corresponding to each phoneme of the phoneme model sequence in the training word;
   c) computing a set of observation probabilities by, for each frame of the frame sequence and each model of the sequence of state-transition models, comparing the energy level of the frame with a predetermined, relative to noise on the telephone lines, energy threshold for the model, and if the energy level is below the energy threshold, setting the observation probability for the frame to zero, otherwise computing the observation probability for the frame;
   d) aligning the frame sequence of acoustic parameter vectors with the sequence of state-transition models to provide a mapping therebetween representative of a path through the sequence of state-transition models having a highest likelihood;
   e) accumulating statistics for a plurality of utterances of said training word using the mapping of step d);
   f) generating a second set of model parameters representative of the sequence of state-transition models corresponding to the training word;
   g) repeating step d) for the second set of model parameters;
   h) comparing the likelihood of the first and second sets of model parameters; and
   i) repeating step b) through h), replacing the first set of model parameters by the second set of model parameters when the second set of parameters provides at least a predetermined improvement in likelihood.

7. A method as claimed in claim 6 wherein the model represents a vowel other than ( ə ) and if the model is one of four first models of the sequence of state-transition models, the energy threshold is 10 dB above background noise; otherwise, if the sequence of state-transition models is greater than 10 models and the model is one of four last models of the sequence, the energy threshold is 1 dB above background noise; otherwise, the energy is 6 dB above background noise.

8. A method as claimed in claim 6 wherein the model represents a vowel ( ə ) and if the model is one of four first models of the sequence of state-transition models, the energy threshold is 6 dB above background noise; otherwise, if the sequence of state-transition models is greater than 10 models and the model is one of four last models of the sequence, the energy threshold is 1 dB above background noise; otherwise, the energy is 3 dB above background noise.

9. A method as claimed in claim 6 wherein the model represents a phoneme selected from the group consisting of l, r, j, w, ʃ, and ʒ and if the sequence of state-transition models is greater than 10 models and the model is one of four last models of the sequence, the energy threshold is 1 dB above background noise; otherwise, the energy is 3 dB above background noise.

10. A method as claimed in claim 6 wherein the model represents a phoneme selected from the group consisting of f, v, ɸ, ð, and h and the model is one of four first models, the energy threshold is 1 dB above background noise.

11. A method as claimed in claim 6 wherein the model represents a phoneme selected from the group consisting of s, z, n, m, and ŋ, the energy threshold is 1 dB above background noise.

12. A method of preparing phoneme models for recognition of speech received via telephone lines comprising the steps of:
   a) analyzing a training word to generate a frame sequence of acoustic parameter vectors representative thereof and to label each frame of the frame sequence as voiced, unvoiced or silence;
   b) providing a first set of model parameters representative of a sequence of state-transition models corresponding to the training word, including the step of labelling each model as voiced, unvoiced or silence in dependence upon a phoneme represented by the model and a relative position of the model in the sequence;
   c) computing a set of observation probabilities by, for each frame of the frame sequence and each model of the model sequence of state-transition models, comparing a voiced-unvoiced-silence (VUS) label of the frame with a VUS label of the model and if the labels do not match, setting the observation probability for the frame to zero, otherwise computing the observation probability for the frame for the training word and the first set of model parameters;
   d) aligning the frame sequence of acoustic parameter vectors with the sequence of state-transition models to provide a mapping therebetween representative of a path through the sequence of state-transition models having a highest likelihood;
   e) accumulating statistics for a plurality of utterances of said training word using the mapping of step d);
   f) generating a second set of model parameters representative of the sequence of state-transition models corresponding to the training word;
   g) repeating step d) for the second set of model parameters;
   h) comparing the likelihood of the first and second sets of model parameters; and
   i) repeating step b) through h), replacing the first set of model parameters by the second set of model parameters when the second set of parameters provides at least a predetermined improvement in likelihood.

13. A method as claimed in claim 12 wherein the phoneme represented is intervocalic silence and wherein the step of labelling maps both unvoiced and silence labels to the model.

14. A method as claimed in claim 12 wherein the phoneme represented is (j) and wherein the step of labelling maps both unvoiced and voiced labels to the model.

15. A method as claimed in claim 12 wherein the phoneme represented is selected from the group consisting of (n, m, and ŋ ) and wherein if the sequence is greater than 10 models and the model is one of four last models, then the step of labelling maps voiced, unvoiced, and silence labels to the phoneme, otherwise the step of labelling maps both voiced and unvoiced labels to the model.

16. A method as claimed in claim 12 wherein the phoneme represented is selected from the group consisting of (vowel, l, r, and w) and wherein if the model is in an initial position or is one of four last models in a sequence of greater than 10 models then the step of labelling maps both voiced and unvoiced labels to the model, otherwise maps a voiced label to the model.

17. A method as claimed in claim 16 wherein the model represents the phoneme (r) when followed by a vowel and preceded by (t) or (f) and the step of labelling maps both voiced and unvoiced labels to the model.

18. A method as claimed in claim 16 wherein the model represents the phoneme (w) when preceded by (k) and the step of labelling maps both voiced and unvoiced labels to the model.

19. A method as claimed in claim 16 wherein the model represents the phoneme (i) when followed by inter-word silence and the step of labelling maps both voiced and unvoiced labels to the model.

20. A method as claimed in claim 16 wherein the model represents the phoneme (I) when preceded by (d) or inter-word silence and the step of labelling maps both voiced and unvoiced labels to the model.

21. A method as claimed in claim 16 wherein the model represents the phoneme (ϵ) when preceded by inter-word silence and the step of labelling maps both voiced and unvoiced labels to the model.

22. A method as claimed in claim 16 wherein the model represents the phoneme (u) when preceded by (j) and the step of labelling maps both voiced and unvoiced labels to the model.

23. A method as claimed in claim 16 wherein the model represents the phoneme ( ə ) when preceded by (s), (ʃ), (r), (d), or inter-word silence and the step of labelling maps both voiced and unvoiced labels to the model.

24. A method of speech recognition for speech received via telephone lines comprising the steps of:
   a) analyzing an unknown utterance to generate a frame sequence of acoustic parameter vectors representative thereof;
   b) providing a first network representing a recognition vocabulary, wherein each branch of the first network is a model representing a phoneme and each complete path through the first network is a sequence of models representing a word in the recognition vocabulary;
   c) providing a second network derived from the first network, in which all sequences of three consecutive phonemes present in the first network are present;
   d) computing transitional probabilities for each node of the second network given the frame sequence of acoustic parameter vectors;

e) searching the second network to determine optimal cumulative probabilities for each node of the second network for all frames of the frame sequence;

f) storing the cumulative probabilities as estimate scores for estimating partial paths in the first network;

g) computing point scores for all phonemes in dependence upon the frame sequence of acoustic parameter vectors;

h) determining a complete path through the first network by evaluating successive one phoneme extensions of partial paths using the estimate scores for the nodes of the second network to find the partial path to extend;

wherein the step of determining includes the step of initiating a search through the first network by:

establishing a stack for recording all paths from the end of the first network;

looking along all branches of the network two phonemes;

obtaining estimate scores for each node of the second network corresponding to each two phoneme branch of the first network;

entering each estimate score into the stack that arranges the scores in descending order;

wherein the step of determining includes the steps of expanding a top entry in the stack by:

obtaining point scores for the first phoneme of the two phoneme branch closest to the end of the first network;

for every exit time in the stack entry and for all possible entrance times for the phoneme determine total actual probability by adding exit scores from the stack entry to point scores for the first phoneme;

computing a new stack entry by adding estimate scores ($P_{est}$) for a next two phoneme node of the second network to the total actual probability ($P_{act}$) for all possible entrance times, selecting n best total probabilities ($P_{act}+P_{est}$), where n is an integer, and storing the total actual probabilities $P_{act}$ and frame times for each, together with the best total probability ($P_{act}+P_{est}$) and a phoneme sequence as the new stack entry;

wherein the step of expanding a top entry includes the steps of:

a) storing a least number, q, of frames used in the estimate score for the top entry of the stack;

b) prior to expanding any top entry of the stack, determining the number of frames, r, used in its estimate score; and c) discarding, from the stack, the top entry when r is greater than the greater of (q+75 and q+s/2) where s is the length of the unknown utterance in frames.

25. A method as claimed in claim 24 wherein the steps are completed using both cepstral parameters and LSP parameters, the step of providing the word in the recognition vocabulary providing word 1 with a cumulative probability L1(word 1) for the cepstral parameter and word 2 with a cumulative probability L2(word 2) for the LSP parameters and wherein a joint recognition includes the further steps of:

if word 1 and word 2 are the same, providing word 1 as the speech recognition output, otherwise;

determining a cumulative probability for word 1 using the LSP parameters (L2(word 1)) and a cumulative probability for word 2 using the cepstral parameters (L1 (word 2));

if L1(word 1)×L2(word 1) is greater than L1(word 2)×L2(word 2), providing word 1 as the speech recognition output, otherwise;

providing word 2 as the speech recognition output.

26. A method as claimed in claim 24 wherein the steps are completed using both cepstral parameters and LSP parameters, the step of providing the word in the recognition vocabulary providing word 1 with a cumulative probability L1(word 1) for the cepstral parameter and word 2 with a cumulative probability L2(word 2) for the LSP parameters and wherein a joint recognition includes the further steps of:

if word 1 and word 2 are the same;

if the word length is less than 7 phonemes and (L1(word 1)+L2(word 1)) is less than a first threshold T1, reject the unknown utterance as out-of-vocabulary;

otherwise, if the word length is between 6 phonemes and 15 phonemes and (L1(word 1)+L2(word 1)) is less than a second threshold T2, reject the unknown utterances as out-of-vocabulary;

otherwise, if the word length is greater than 14 phonemes and (L1(word 1)+L2(word 1)) is less than a third threshold T3, reject the unknown utterance as out-of-vocabulary;

otherwise, if word 1 and word 2 are different, reject the unknown utterance as out-of-vocabulary.

27. Apparatus for speech recognition, comprising:

means for analyzing an unknown utterance to generate a frame sequence of acoustic parameter vectors representative thereof;

b) means for providing a first network representing a recognition vocabulary, wherein each branch of the first network is a model representing a phoneme and each complete path through the first network is a sequence of models representing a word in the recognition vocabulary;

c) means for providing a second network derived from the first network, in which all sequences of three consecutive phonemes present in the first network are present;

d) means for computing transitional probabilities for each node of the second network given the frame sequence of acoustic parameter vectors;

e) means for searching the second network to determine optimal cumulative probabilities for each node of the second network for all frames of the frame sequence;

f) means for storing the cumulative probabilities as estimate scores for estimating partial paths in the first network;

g) means for computing point scores for all phonemes in the second network in dependence upon the frame sequence of acoustic parameter vectors; and h) means for determining a complete path through the first network by evaluating successive one phoneme extensions of partial paths using the estimate scores for the nodes of the second network to find the partial path to extend.

28. Apparatus for providing information via a telephone network, comprising:

means for accepting a call from an operator via the telephone network;

means for prompting the operator to request information;

means for recognizing speech from the operator to identify a member of a recognition vocabulary, the recognition vocabulary being represented by a first network, wherein each branch represents a phoneme and each complete path through the first network is a sequence of models representing a member of the recognition vocabulary and wherein a second network is derived from the first network, in which all sequences of three consecutive phonemes present in the first network are present;

means for accessing a computerized information source to request information from the computerized information source in dependence upon the member of the recognition vocabulary identified; and means for synthesizing speech to provide the accessed information to the operator in verbal form.

* * * * *